United States Patent
Oda et al.

(10) Patent No.: US 12,346,571 B2
(45) Date of Patent: Jul. 1, 2025

(54) STORAGE SYSTEM AND STORAGE NODE MANAGEMENT METHOD

(71) Applicant: Hitachi, Ltd., Tokyo (JP)

(72) Inventors: Hajime Oda, Tokyo (JP); Ryo Aikawa, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 59 days.

(21) Appl. No.: 18/459,551

(22) Filed: Sep. 1, 2023

(65) Prior Publication Data

US 2024/0354008 A1 Oct. 24, 2024

(30) Foreign Application Priority Data

Apr. 19, 2023 (JP) .................. 2023-068517

(51) Int. Cl.
*G06F 3/06* (2006.01)

(52) U.S. Cl.
CPC .......... *G06F 3/0617* (2013.01); *G06F 3/0635* (2013.01); *G06F 3/0653* (2013.01); *G06F 3/067* (2013.01)

(58) Field of Classification Search
CPC .... G06F 3/0617; G06F 3/0635; G06F 3/0653; G06F 3/067
USPC ........................................................ 711/156
See application file for complete search history.

(56) References Cited

U.S. PATENT DOCUMENTS

| | | | |
|---|---|---|---|
| 11,221,935 B2 | 1/2022 | Satoyama et al. | |
| 2018/0041600 A1* | 2/2018 | Aikoh | ............ G06F 11/20 |
| 2019/0173739 A1* | 6/2019 | Cui | ............ H04L 45/02 |
| 2020/0042416 A1 | 2/2020 | Satoyama et al. | |

FOREIGN PATENT DOCUMENTS

JP 6850771 B 3/2021

* cited by examiner

*Primary Examiner* — Hua J Song
(74) *Attorney, Agent, or Firm* — Volpe Koenig

(57) ABSTRACT

A worker node included in a storage system 1 includes a score calculation unit 31 that calculates a score of the worker node based on a failure history and an operation status of the worker node, and a master node (P) includes a promotion node selection unit 52 that compares scores for each worker node when a failure occurs in one of master nodes and selects, based on the scores, a worker node to be promoted to a master node instead of the master node in which the failure has occurred.

10 Claims, 23 Drawing Sheets

| # | INDEX NAME | INDEX CLASSIFICATION | DESCRIPTION | CALCULATION METHOD |
|---|---|---|---|---|
| 1 | USER DATA DRIVE FAILURE | A: MAIN BODY FAILURE | REFLECT, IN SCORE, FAILURE HISTORY OF DRIVE THAT STORES USER DATA | AVERAGE VALUE OF NUMBER OF TIMES OF DRIVE BLOCKAGE PER MONTH: x<br>x=0 ... SCORE=3<br>0<x≤ONE TIME ... SCORE=2<br>ONE TIME<x≤FIVE TIMES ... SCORE=1<br>FIVE TIMES≤x ... SCORE=0 |
| 2 | NODE BLOCKAGE | A: MAIN BODY FAILURE | REFLECT, IN SCORE, HISTORY OF INOPERABILITY AS NODE DUE TO SOFTWARE FAILURE OR HARDWARE FAILURE | AVERAGE VALUE OF NUMBER OF TIMES OF NODE BLOCKAGE PER MONTH: x<br>0=x ... SCORE=3<br>0<x≤THREE TIMES ... SCORE=2<br>THREE TIMES<x≤10 TIMES ... SCORE=1<br>10 TIMES≤x ... SCORE=0 |
| 3 | Compute Network FAILURE | B: NW FAILURE | REFLECT, IN SCORE, NUMBER OF TIMES OF RETRANSMISSION REQUEST OF DATA TRANSMISSION RELATED TO READING AND WRITING OF USER DATA | AVERAGE VALUE OF NUMBER OF TIMES OF RETRANSMISSION REQUEST PER IO: x<br>x<10 ... SCORE=3<br>10 TIMES<x≤100 TIMES ... SCORE=2<br>100 TIMES<x≤700 TIMES ... SCORE=1<br>700 TIMES<x ... SCORE=0 |
| 4 | Inter-Node Network FAILURE | B: NW FAILURE | REFLECT, IN SCORE, NUMBER OF TIMES OF RETRANSMISSION REQUEST OF INTER-NODE COMMUNICATION | AVERAGE VALUE OF NUMBER OF TIMES OF RETRANSMISSION REQUEST PER INTER-NODE COMMUNICATION: x<br>x=0 ... SCORE=2<br>0<x≤ONE TIME ... SCORE=1<br>THREE TIMES<x≤ ... SCORE=0 |
| 5 | Management Network FAILURE | B: NW FAILURE | REFLECT, IN SCORE, NUMBER OF TIMES OF RETRANSMISSION REQUEST OF COMMUNICATION RELATED TO MANAGEMENT OPERATION FROM USER | AVERAGE VALUE OF NUMBER OF TIMES OF RETRANSMISSION REQUEST PER COMMUNICATION FOR MANAGEMENT OPERATION=x<br>x=0 ... SCORE=2<br>0<x≤ONE TIME ... SCORE=1<br>THREE TIMES<x≤ ... SCORE=0 |
| 6 | OPERATING TIME OF PHYSICAL SERVER ON WHICH NODE IS OPERATING | C: OPERATING TIME | REFLECT, IN SCORE, SHORT OPERATING TIME OF NODE | AVERAGE VALUE OF OPERATING TIME: x<br>x ⊂ {INITIAL FAILURE PERIOD} ... SCORE=1<br>x ⊂ {ACCIDENTAL FAILURE PERIOD} ... SCORE=2<br>x ⊂ {WEAR FAILURE PERIOD} ... SCORE=0 |
| 7 | OPERATING TIME OF DRIVE ON PHYSICAL SERVER | C: OPERATING TIME | REFLECT, IN SCORE, SHORT OPERATING TIME OF DRIVE | AVERAGE VALUE OF OPERATING TIME: x<br>x ⊂ {INITIAL FAILURE PERIOD} ... SCORE=1<br>x ⊂ {ACCIDENTAL FAILURE PERIOD} ... SCORE=2<br>x ⊂ {WEAR FAILURE PERIOD} ... SCORE=0 |
| 8 | SHARING STATUS OF (VIRTUALIZATION ENVIRONMENT) RESOURCE | D: VIRTUALIZATION STATUS | REFLECT, IN SCORE, PROCESSING TIME TAKEN BY ANOTHER VM SHARING PHYSICAL CPU | AVERAGE VALUE OF TIME RATIO IN WHICH VM WAITS FOR CPU ALLOCATION IN CERTAIN PERIOD: x<br>x≤10% ... SCORE=2<br>10%<x≤30% ... SCORE=1<br>30%<x ... SCORE=0 |

| # | INDEX CLASSIFICATION | EXAMPLE OF MOTIVATION FOR CHANGING PRIORITY ORDER OF INDEX CLASSIFICATION |
|---|---|---|
| 1 | A: MAIN BODY FAILURE | SINCE IT IS FAILURE HISTORY FOR FUNDAMENTAL FUNCTION AS STORAGE NODE, IT IS ASSUMED THAT COMPARISON IS ALWAYS PERFORMED WITH HIGH PRIORITY. |
| 2 | B: NW FAILURE | WHEN MANAGEMENT OF NETWORK INFRASTRUCTURE DEPENDS ON CLOUD SERVICE SIDE AND IT IS NOT CONSIDERED IMPORTANT, PRIORITY ORDER OF "B: NW FAILURE" IS LOWERED. |
| 3 | C: OPERATING TIME | WHEN OPERATING TIME IS NOT CONSIDERED IMPORTANT BECAUSE REPLACEMENT OF SERVER IS PERFORMED AT SHORT INTERVALS, PRIORITY ORDER OF "C: OPERATING TIME" IS LOWERED. |
| 4 | D: VIRTUALIZATION STATUS | · WHEN CLUSTER IS CONSTRUCTED IN VIRTUALIZATION ENVIRONMENT BUT CONSTRUCTED WITH SEPARATE HARDWARE RESOURCES, PRIORITY ORDER OF "D: VIRTUALIZATION STATUS" IS LOWERED.<br>· WHEN IT IS ON-PREMISES ENVIRONMENT, THIS INDEX CLASSIFICATION IS NOT USED. |

| WORKER NODE ID | SCORE OF INDEX CLASSIFICATION A | SCORE OF INDEX CLASSIFICATION B | SCORE OF INDEX CLASSIFICATION C | SCORE OF INDEX CLASSIFICATION D | LAST UPDATE TIME | UPDATER NODE ID |
|---|---|---|---|---|---|---|
| Node_A | 5 | 4 | 2 | 1 | MM/DD/YY hh:mm:ss | node_E |
| Node_B | 4 | 3 | 2 | 1 | MM/DD/YY hh:mm:ss | node_E |
| Node_C | 3 | 2 | 1 | 0 | MM/DD/YY hh:mm:ss | node_E |
| Node_D | 2 | 1 | 0 | 0 | MM/DD/YY hh:mm:ss | node_E |

| INDEX NAME | HISTORY | LAST UPDATE TIME |
|---|---|---|
| USER DATA DRIVE FAILURE | 0 | MM/DD/YY hh:mm:ss |
| NODE BLOCKAGE | 1 | MM/DD/YY hh:mm:ss |
| Compute Network FAILURE | 20 | MM/DD/YY hh:mm:ss |
| Inter-Node Network FAILURE | 0 | MM/DD/YY hh:mm:ss |
| Management Network FAILURE | 4 | MM/DD/YY hh:mm:ss |
| OPERATING TIME OF PHYSICAL SERVER ON WHICH NODE IS OPERATING | 1200 | MM/DD/YY hh:mm:ss |
| OPERATING TIME OF DRIVE ON PHYSICAL SERVER | 1400 | MM/DD/YY hh:mm:ss |
| SHARING STATUS OF (VIRTUALIZATION ENVIRONMENT) RESOURCE | 20 | MM/DD/YY hh:mm:ss |

| INDEX NAME | INDEX CLASSIFICATION | CALCULATION METHOD |
|---|---|---|
| USER DATA DRIVE FAILURE | A | AVERAGE VALUE OF NUMBER OF TIMES OF DRIVE BLOCKAGE PER MONTH: x<br>x=0 ... SCORE=3<br>0<x≤ONE TIME ... SCORE=2<br>ONE TIME<x≤FIVE TIMES ... SCORE=1<br>FIVE TIMES≤x ... SCORE=0 |
| NODE BLOCKAGE | A | AVERAGE VALUE OF NUMBER OF TIMES OF NODE BLOCKAGE PER MONTH: x<br>0=x ... SCORE=3<br>0<x≤THREE TIMES ... SCORE=2<br>THREE TIMES<x≤10 TIMES ... SCORE=1<br>10 TIMES≤x ... SCORE=0 |
| Compute Network FAILURE | B | AVERAGE VALUE OF NUMBER OF TIMES OF RETRANSMISSION REQUEST PER IO: x<br>x<10 ... SCORE=3<br>10 TIMES<x≤100 TIMES ... SCORE=2<br>100 TIMES<x≤700 TIMES ... SCORE=1<br>700 TIMES<x ... SCORE=0 |
| Inter-Node Network FAILURE | B | AVERAGE VALUE OF NUMBER OF TIMES OF RETRANSMISSION REQUEST PER INTER-NODE COMMUNICATION: x<br>x=0 ... SCORE=2<br>0<x≤ONE TIME ... SCORE=1<br>THREE TIMES<x ... SCORE=0 |
| Management Network FAILURE | B | AVERAGE VALUE OF NUMBER OF TIMES OF RETRANSMISSION REQUEST PER COMMUNICATION FOR MANAGEMENT OPERATION=x<br>x=0 ... SCORE=2<br>0<x≤ONE TIME ... SCORE=1<br>THREE TIMES<x ... SCORE=0 |
| OPERATING TIME OF PHYSICAL SERVER ON WHICH NODE IS OPERATING | C | AVERAGE VALUE OF OPERATING TIME: x<br>x ⊂ {INITIAL FAILURE PERIOD} ... SCORE=1<br>x ⊂ {ACCIDENTAL FAILURE PERIOD} ... SCORE=2<br>x ⊂ {WEAR FAILURE PERIOD} ... SCORE=0 |
| OPERATING TIME OF DRIVE ON PHYSICAL SERVER | C | AVERAGE VALUE OF OPERATING TIME: x<br>x ⊂ {INITIAL FAILURE PERIOD} ... SCORE=1<br>x ⊂ {ACCIDENTAL FAILURE PERIOD} ... SCORE=2<br>x ⊂ {WEAR FAILURE PERIOD} ... SCORE=0 |
| SHARING STATUS OF (VIRTUALIZATION ENVIRONMENT) RESOURCE | D | AVERAGE VALUE OF TIME RATIO IN WHICH VM WAITS FOR CPU ALLOCATION IN CERTAIN PERIOD: x<br>x≤10% ... SCORE=2<br>10%<x≤30% ... SCORE=1<br>30%<x ... SCORE=0 |

| TRANSMITTER NODE ID | SCORE OF INDEX CLASSIFICATION A | SCORE OF INDEX CLASSIFICATION B | SCORE OF INDEX CLASSIFICATION C | SCORE OF INDEX CLASSIFICATION D |
|---|---|---|---|---|
| Node_A | 5 | 4 | 2 | 1 |

# STORAGE SYSTEM AND STORAGE NODE MANAGEMENT METHOD

BACKGROUND OF THE INVENTION

1. Field of the Invention

The present invention relates to a storage system and a storage node management method.

2. Description of the Related Art

In the conventional server cluster technology, an operation of a system is continued while repeating failover until a number of failed servers exceeds a threshold among a total number of servers, and when the number of failed servers exceeds the threshold, the entire system is temporarily stopped to perform maintenance work such as server replacement.

In a storage system such as a software defined storage (SDS) including a large number of storage nodes (hereinafter, abbreviated as a "node"), an operation is performed in a redundant configuration in which a copy of data is stored in different server housings in order to improve availability and reliability. The SDS is a storage device constructed by mounting software having a storage function on a general-purpose server device. In addition, the storage node is a physical server or a virtual server to which a central processing unit (CPU), a memory, and a drive are allocated.

In the SDS, each node is managed together with a plurality of other nodes in a group called a storage cluster (hereinafter, abbreviated as a "cluster"). The cluster is a virtual storage system constructed from a plurality of storage nodes. In the cluster, a coordination service or a scale-out DB for causing nodes to perform a cooperative operation operates. The cooperative operation is processing of checking the operation of each node in the cluster and managing information used for each node. A node (referred to as a master node) having a role of a master in the cluster has a function of causing each node in the cluster to perform the cooperative operation.

JP 6850771 B discloses that "first failure information related to a first failure occurring in a storage node is acquired, a rebuilding time of a configuration of the storage system with respect to the first failure information and a failure occurrence probability that a second failure occurs are calculated based on storage node management information, a probability of transition to a state in which the storage system is stopped due to the failure is calculated as an availability level by using the rebuilding time and the failure occurrence probability, and necessity of maintenance work is notified based on the availability level".

SUMMARY OF THE INVENTION

In the cluster, when a number of master nodes is less than a certain number, the function of the cooperative operation does not normally operate. Therefore, in the cluster, a plurality of master nodes is always maintained, and the master nodes are configured to be redundant. In a case where a failure occurs in the master node, an operation of causing a new node to participate in the cluster as the master node is performed in order to maintain the number of master nodes. In this operation, when the new node is constructed, there is a method of replacing a node in which a failure has occurred with a newly constructed node by a manual maintenance operation.

In addition, in a case where a failure occurs in the master node, there is also a method in which master promotion is performed in which another node (referred to as a "worker node") that is not an operating master node is promoted to the master node. Switching a worker node in the cluster that is not a master node to a master node in this manner is referred to as "master promotion". At the time of the master promotion, a worker node set in advance at the time of initial cluster construction has been promoted.

The worker node has an operation record up to a point of time when a failure occurs in the master node as a history, and there is a difference in the past number of times of failure occurrence, operating time, and the like for each worker node. When a node having caused a large number of failures in the past is selected as a master promotion target, there is a concern that the failure may occur again after the master promotion. However, conventionally, the operation record of the worker node has only been used for a user to refer to grasp contents of the failure, and worker nodes as master promotion candidates can only be handled in a same row. Therefore, it is difficult for the user to select an optimal worker node for master promotion from a large number of worker nodes.

The present invention has been made in view of such a situation, and an object of the present invention is to automatically select a node to be a master promotion target.

In the storage system according to the present invention, a plurality of storage nodes, each of which includes a processor, a memory, and a storage device, are coupled by a network, and a cluster is configured with the plurality of storage nodes as master nodes and remaining storage nodes as worker nodes. A processor of a worker node includes a score calculation unit that calculates a score of the worker node based on a failure history and an operation status of the worker node, and a processor of a master node includes a promotion node selection unit that compares scores for each worker node when a failure occurs in one of the master nodes and selects, based on the scores, a worker node to be promoted to a master node instead of the master node in which a failure has occurred.

According to the present invention, it is possible to automatically select a worker node to be a master promotion target based on a score.

Problems, configurations, and effects other than those described above will be clarified by the following description of an embodiment.

BRIEF DESCRIPTION OF THE DRAWINGS

FIG. 13 is a diagram illustrating an example of an index management table according to the embodiment of the present invention;

FIG. 14 is a diagram illustrating an example of a priority order management table of index classifications according to the embodiment of the present invention;

FIG. 15 is a diagram illustrating an example of a score table according to the embodiment of the present invention;

FIG. 16 is a diagram illustrating an example of a history management table according to the embodiment of the present invention;

FIG. 17 is a diagram illustrating an example of a score calculation table according to the embodiment of the present invention;

FIG. 18 is a diagram illustrating an example of score information according to the embodiment of the present invention;

DESCRIPTION OF THE PREFERRED EMBODIMENTS

Figure 1:
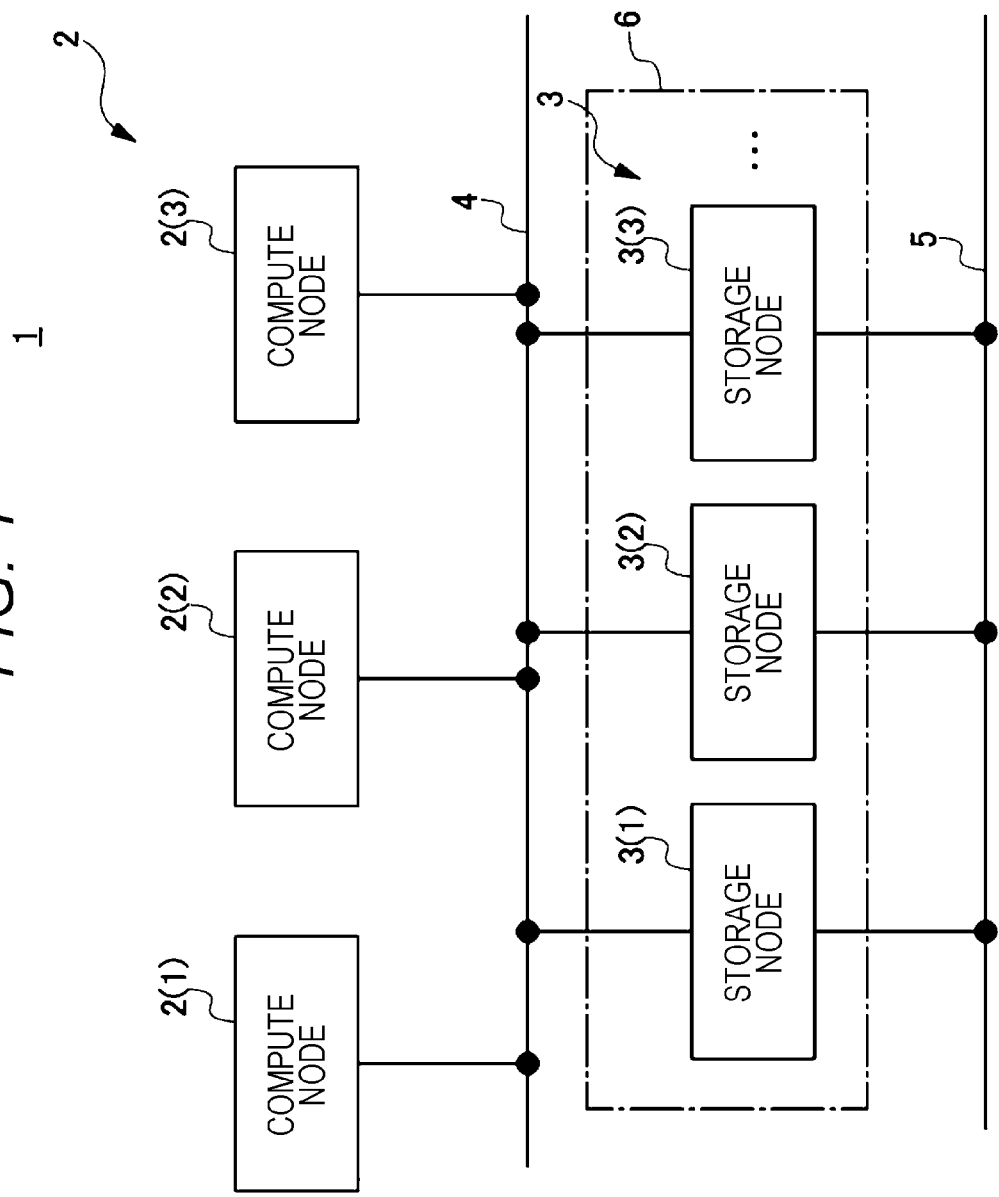
FIG. 1 is a diagram illustrating a configuration example of a storage system according to an embodiment of the present invention.

Hereinafter, an embodiment of the present invention will be described with reference to the accompanying drawings. In the present specification and the drawings, components having substantially the same function or configuration are denoted by the same reference numerals, and redundant description is omitted.

In the following description, there is a case where processing performed by executing a program is described. However, the program is executed by at least one or more processors (for example, a CPU) to perform predetermined processing by using a storage resource (for example, a memory) and/or an interface device (for example, a communication port) as appropriate. Therefore, a subject of the processing may be a processor.

Similarly, the subject of the processing performed by executing the program may be a controller, a device, a system, a computer, a node, a storage system, a storage device, a server, a management computer, a client, or a host having a processor. The subject (for example, a processor) of the processing performed by executing the program may include a hardware circuit that performs a part or all of the processing. For example, the subject of the processing performed by executing the program may include a hardware circuit that performs encryption and decryption or compression and decompression. The processor operates as a functional unit that realizes a predetermined function by performing processing according to the program. The device and the system including the processor are a device and a system including these functional units.

The program may be installed in a device such as a computer from a program source. The program source may be, for example, a program distribution server or a storage medium readable by a computer. When the program source is a program distribution server, the program distribution server includes a processor (for example, a CPU) and a storage resource, and the storage resource may further store a distribution program and a program to be distributed. Then, when the processor of the program distribution server executes the distribution program, the processor of the program distribution server may distribute a distribution target program to another computer. In the following description, two or more programs may be realized as one program, or one program may be realized as two or more programs.

EMBODIMENT

FIG. 1 is a diagram illustrating a configuration example of a storage system 1 according to an embodiment of the present invention.

The storage system 1 includes a plurality of compute nodes 2(1) to 2(3) and a plurality of storage nodes 3(1) to 3(3). Note that the reference sign "2" is used when the compute nodes 2(1) to 2(3) are not individually specified. In addition, reference numeral "3" is used when the storage nodes 3(1) to 3(3) are not individually specified. The same applies to the reference numerals of the other components.

Each compute node 2 and each storage node 3 are coupled via a storage service network 4 including, for example, a fiber channel (Fibre Channel), Ethernet (registered trademark), InfiniBand, a wireless local area network (LAN), or the like.

The storage nodes 3 are coupled via a back-end network 5 including a LAN, Ethernet (registered trademark), InfiniBand, a wireless LAN, or the like.

However, the storage service network 4 and the back-end network 5 may be configured by the same network, and each compute node 2 and each storage node 3 may be coupled to a management network other than the storage service network 4 and the back-end network 5.

The compute node 2 is a general-purpose computer device that functions as a host (host device) for the storage node 3. Note that the compute node 2 may be a virtual computer device such as a virtual machine. The compute node 2 reads and writes data from and to the storage node 3 via the storage service network 4 in response to a user's operation or a request from a mounted application program.

The storage node 3 is a server device that provides a storage area for reading and writing data from and to the compute node 2. The storage node 3 may be a virtual machine. In addition, a configuration may be adopted in which the storage node 3 coexists in the same physical node as the compute node 2.

As illustrated in FIG. 1, each storage node 3 according to the present embodiment is collectively managed in a group called a cluster 6 together with one or a plurality of other storage nodes 3. In the example of FIG. 1, a case where one cluster 6 is set is exemplified, but a plurality of clusters 6 may be provided in the storage system 1. The cluster 6 may be referred to as a distributed storage system.

Figure 2:
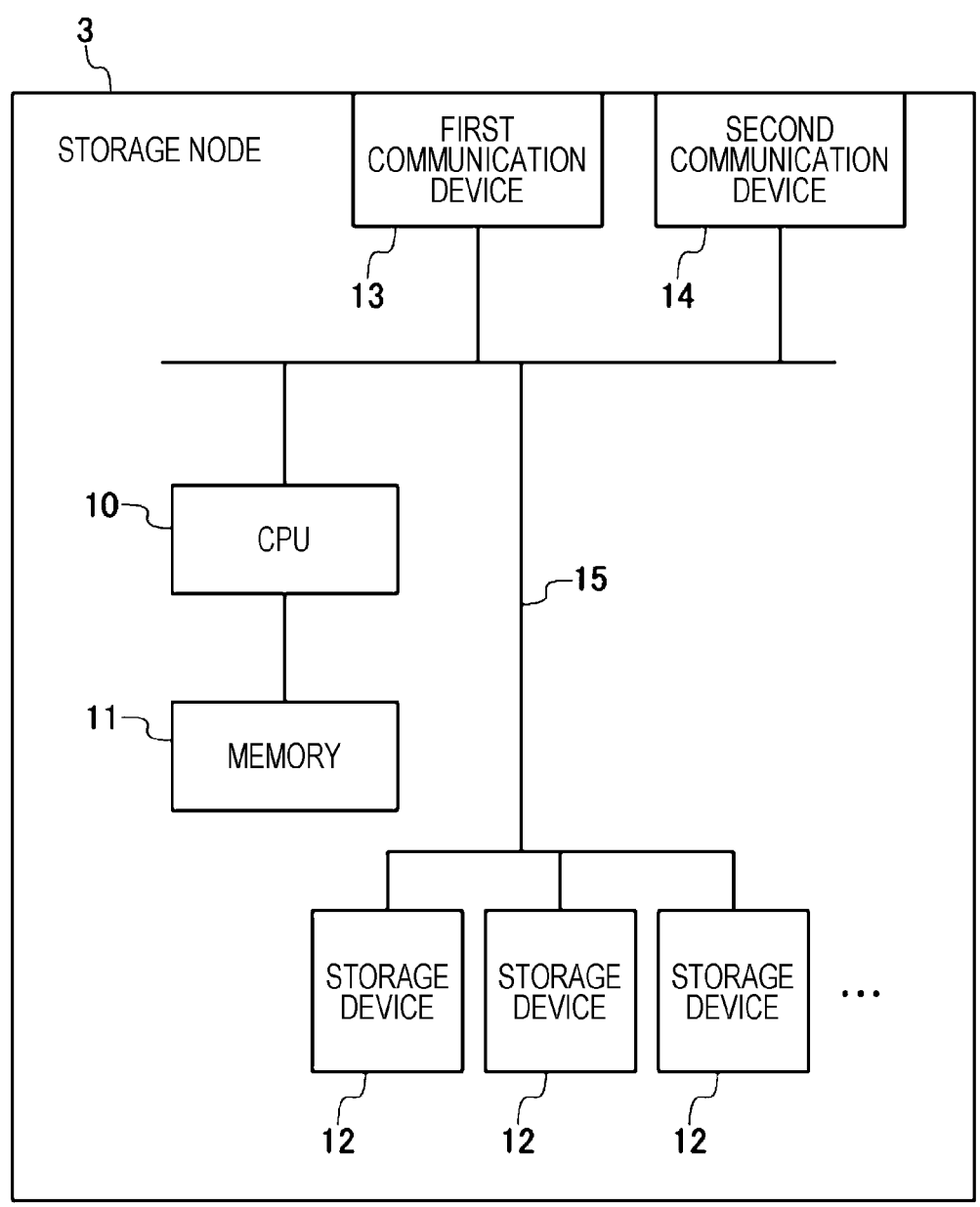
FIG. 2 is a block diagram illustrating a schematic configuration example of a storage node according to the embodiment of the present invention.

FIG. 2 is a block diagram illustrating a schematic configuration example of the storage node 3.

As illustrated in FIG. 2, the storage node 3 includes one or more CPUs 10, one or more memories 11, a plurality of storage devices 12, a first communication device 13, and a second communication device 14. The storage node 3 includes a general-purpose physical server device in which the CPU 10 and the storage device 12 are coupled to the first communication device 13 and the second communication device 14 via an internal network 15.

The CPU 10 is a processor that controls the entire storage node 3. The memory 11 includes a volatile semiconductor memory such as a static random access memory (SRAM) or a dynamic RAM (DRAM), or a nonvolatile semiconductor memory, and is used as a work memory of the CPU 10 to temporarily hold various programs and necessary data. At least one CPU 10 executes the program stored in the memory 11 to execute various processing as the entire storage node 3 as described later.

The storage device 12 includes a large-capacity nonvolatile storage device such as a hard disk drive (HDD), a solid state drive (SSD), or a storage class memory (SCM), is coupled by an interface such as a non-volatile memory express (NVMe), a serial attached SCSI (small computer system interface) (SAS), or a serial advanced technology attachment (Serial ATA) (SATA), and provides a storage area for reading and writing data in response to a read request or a write request from the compute node 2.

The first communication device 13 is an interface for the storage node 3 to communicate with the compute node 2 via the storage service network 4, and includes, for example, a fiber channel card, an Ethernet (registered trademark) card, an InfiniBand card, a wireless LAN card, or the like. The first communication device 13 performs protocol control at the time of communication with the compute node 2.

The second communication device 14 is an interface for the storage node 3 to communicate with another storage node 3 via the back-end network 5, and includes, for example, a fiber channel card, an Ethernet (registered trademark) card, an InfiniBand card, a wireless LAN card, a PCIe host adapter, and the like. The second communication device 14 performs protocol control at the time of communication with another storage node 3.

As illustrated in FIG. 1, each storage node 3 according to the present embodiment is collectively managed in a group called a cluster 6 together with one or a plurality of other storage nodes 3. In the example of FIG. 1, a case where only one cluster 6 is set is exemplified, but a plurality of clusters 6 may be provided in the storage system 1.

<Conventional Master Promotion Method>

Here, a conventional master promotion method will be described with reference to FIG. 3.

Figure 3:
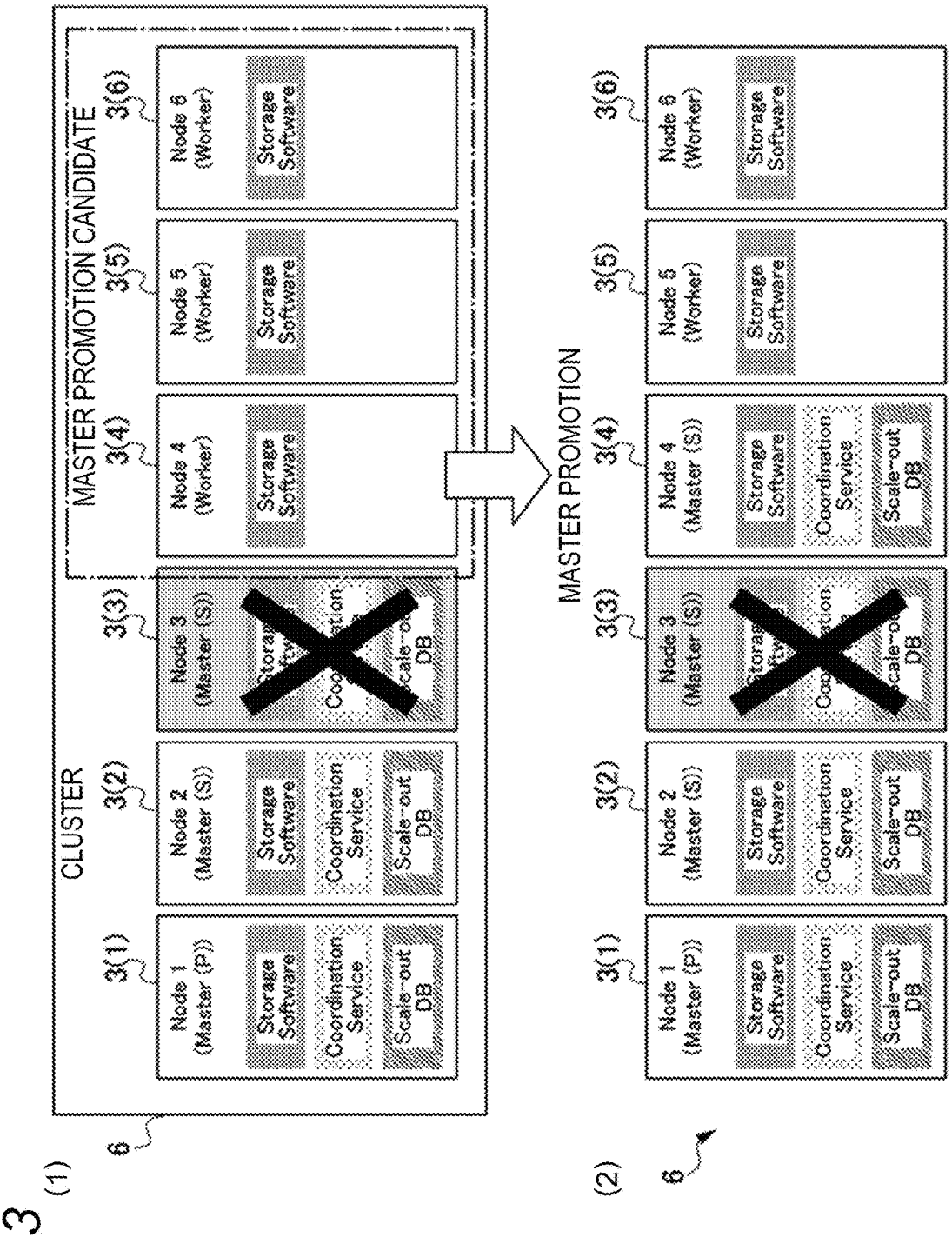
FIG. 3 is a diagram illustrating an example of a conventional method of promoting one node selected from among master promotion candidate worker nodes to a master node.

FIG. 3 is a diagram illustrating an example of a conventional method of promoting one node selected from master promotion candidate worker nodes to a master node.

As illustrated in a node configuration diagram (1) of FIG. 3, the cluster 6 is configured to include six storage nodes 3 indicating the entire plurality of nodes of the master and the worker, and is used as an example of the storage cluster. Each storage node 3 is given a node name such as a Node 1 to a Node 6, and the node name may be used in the following description. The Node 1 to Node 3 are master nodes, and a Node 4 to a Node 6 are worker nodes. The master node is a storage node in the cluster 6 having a role of managing the entire cluster 6. In addition, the worker node is a node in the cluster 6 that is not a master node. Both the master node and the worker node are nodes that always operate.

In the cluster 6, one of the plurality of master nodes is configured as a primary used as an active system, and the rest are configured as a secondary used as a standby system. For example, among the Node 1 to Node 3 which are the master nodes, the Node 1 is the primary, and the Node 2 and the Node 3 are the secondary. When a problem occurs in the master node of the active system, the secondary master node takes over a function of the primary. In the following description, the primary master node is referred to as a master node (P), and the secondary master node is referred to as a master node (S). In the drawing, the master node (P) is described as "Master (P)", and the master node (S) is described as "Master(S)".

In the Node 1 to the Node 3 which are the master nodes, storage software, coordination service, and scale-out DB operate.

The storage software is a software program that realizes the cluster 6.

The coordination service is a software program that controls a cooperative operation in the cluster 6. The coordination service is used as a basis for operating one or a plurality of distributed storage nodes as one cluster 6. The coordination service is a basis of processing according to the present embodiment. In addition, the coordination service is also used to realize vital monitoring between the storage nodes, process communication between a plurality of storage nodes 3, and the like.

The scale-out DB is a database that manages information in the cluster 6 while making it redundant. The scale-out DB is redundantly executed only by the master node (P) and the master node (S), and is not executed by the worker node. Therefore, even when a failure occurs in one master node (S), contents of the scale-out DB are not impaired because the scale-out DBs of the other master nodes(S) and the master node (P) are executed.

In the Node 4 to the Node 6 which are the worker nodes, only the storage software operates. When a failure occurs in one of the master nodes (for example, Node 3), one of the Node 4 to Node 6 becomes a candidate for master promotion.

As illustrated in a node configuration diagram (2) of FIG. 3, the Node 3 in which a failure has occurred is separated from the configuration of the cluster 6. Then, the Node 4 that has been a worker node is promoted to a master, and in addition to the storage software, the coordination service and the scale-out DB start to operate. The Node 4 promoted to the master is used as the master node (S).

Figure 4:
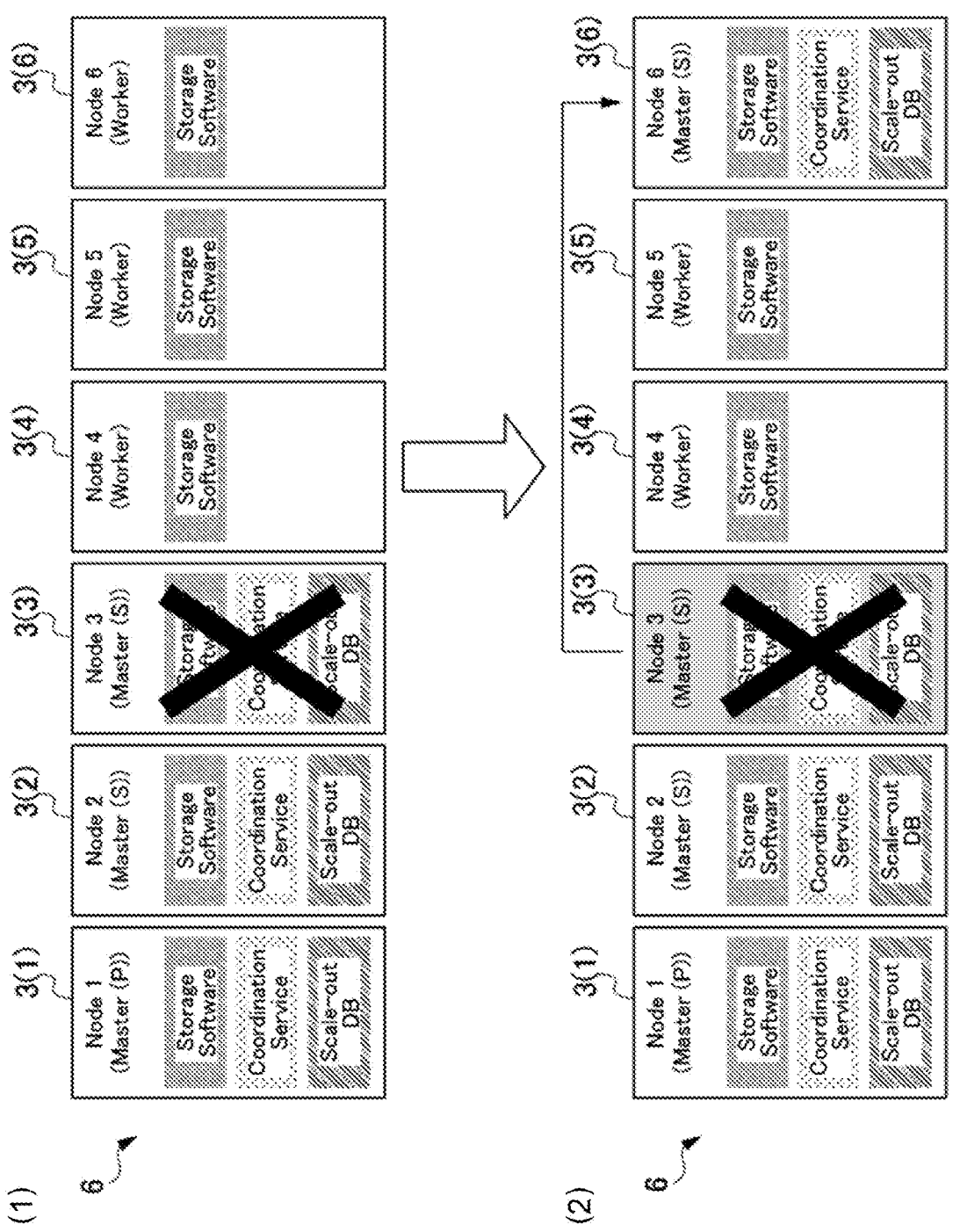
FIG. 4 is a diagram illustrating a concept as a premise of master promotion.

FIG. 4 is a diagram illustrating a concept as a premise of master promotion. Here, the master promotion will be described separately for Premise 1 and Premise 2.

(Premise 1)

When a majority of the master nodes are blocked, the cluster 6 cannot operate correctly. As illustrated in a node configuration diagram (1) of FIG. 4, when one master node (Node 3) among the three master nodes (Node 1 to Node 3) is left with a failure, when a failure occurs in another master node, the majority of the master nodes (two out of the three master nodes) are blocked. Therefore, it is desirable that the number of master nodes is configured with redundancy of three or five.

(Premise 2)

As described in Premise 1, when a failure occurs in one master node (Node 3), one (for example, Node 6) of the worker nodes is promoted to a master node as illustrated in a node configuration diagram (2) of FIG. 4. The function of the Node 3 is taken over by the Node 6. When the master promotion is automatically performed, the number of master nodes in which no failure has occurred is three, so that the operation of the cluster 6 can be continued while maintaining the redundancy of the master node. Note that in a case where the Node 6 is promoted to a master, the coordination service and the scale-out DB are not activated in the Node 4 and the Node 5 which are the worker nodes. The reason for this is that when the number of master nodes increases, it takes time to replicate DB information between the master nodes. By minimizing the number of master nodes to be operated, the time required for replication of the DB information is reduced.

Figure 5:
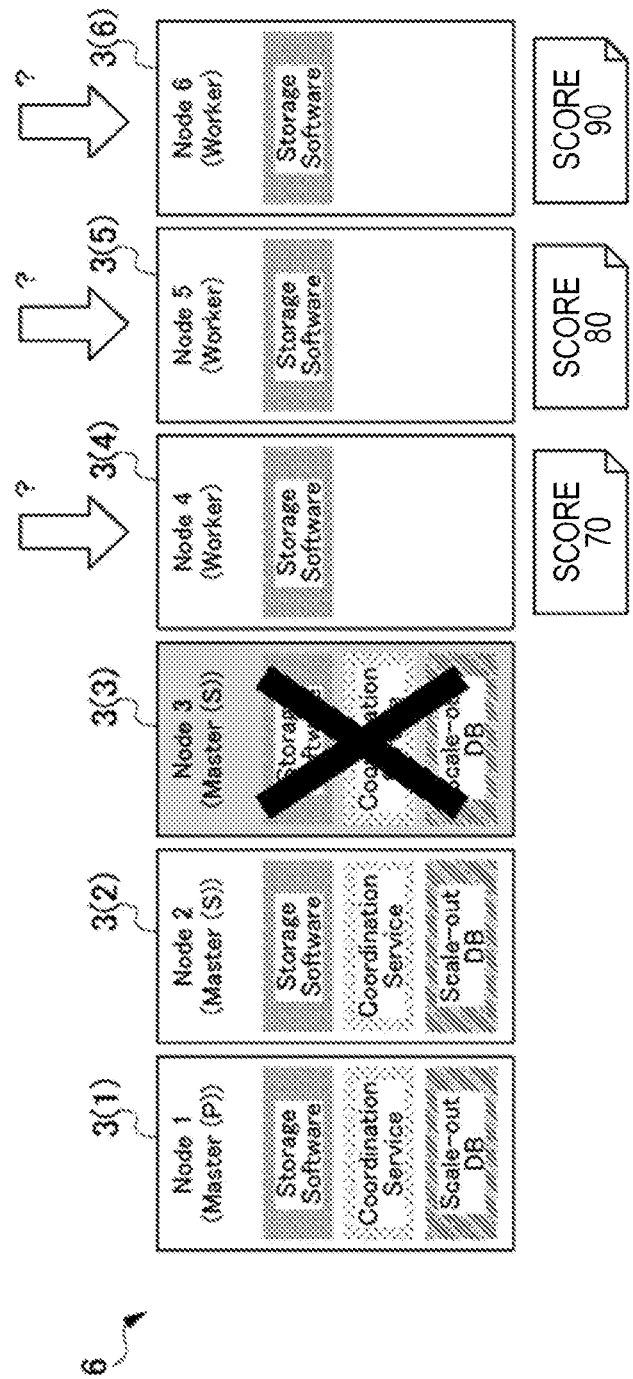
FIG. 5 is a diagram illustrating an example of a conventional method of selecting a worker node to be promoted to a master.

FIG. 5 is a diagram illustrating an example of a conventional method of selecting a worker node to be promoted to a master.

The cluster 6 includes a plurality of worker nodes (Node 4 to Node 6) as master promotion candidates. The user needs to select a worker node suitable for master promotion from a plurality of worker nodes.

As described above, conventionally, the operation record of the worker node has been only used for analysis or the like when a failure occurs. In addition, when a resource (mainly hardware) of a storage node in which a failure has occurred in the past is replaced or repaired, an operation record corresponding to a place where the resource has been replaced or repaired is reset. For this reason, the user has not been able to use the operation record of the node after the initial construction to determine a master promotion target, and sometimes selects a node in which a failure is likely to occur again as the master promotion target. Note that a question mark in the drawing represents that it is unclear which one of the Node 4 to the Node 6, which are the worker nodes, is selected.

On the other hand, in the present embodiment, a score is automatically calculated based on a failure history of the worker node and a configuration of the worker node, and a worker node having a high score and high reliability is automatically selected. The score is a value indicating how stably the storage node has operated so far. For example, it is assumed that a score of the Node 4 is "70", a score of the Node 5 is "80", and a score of the Node 6 is "90". In this case, the Node 6 having a highest score is selected as a node to be promoted to a master.

<Node Configuration Example According to One Embodiment of Present Invention>

Figure 6:
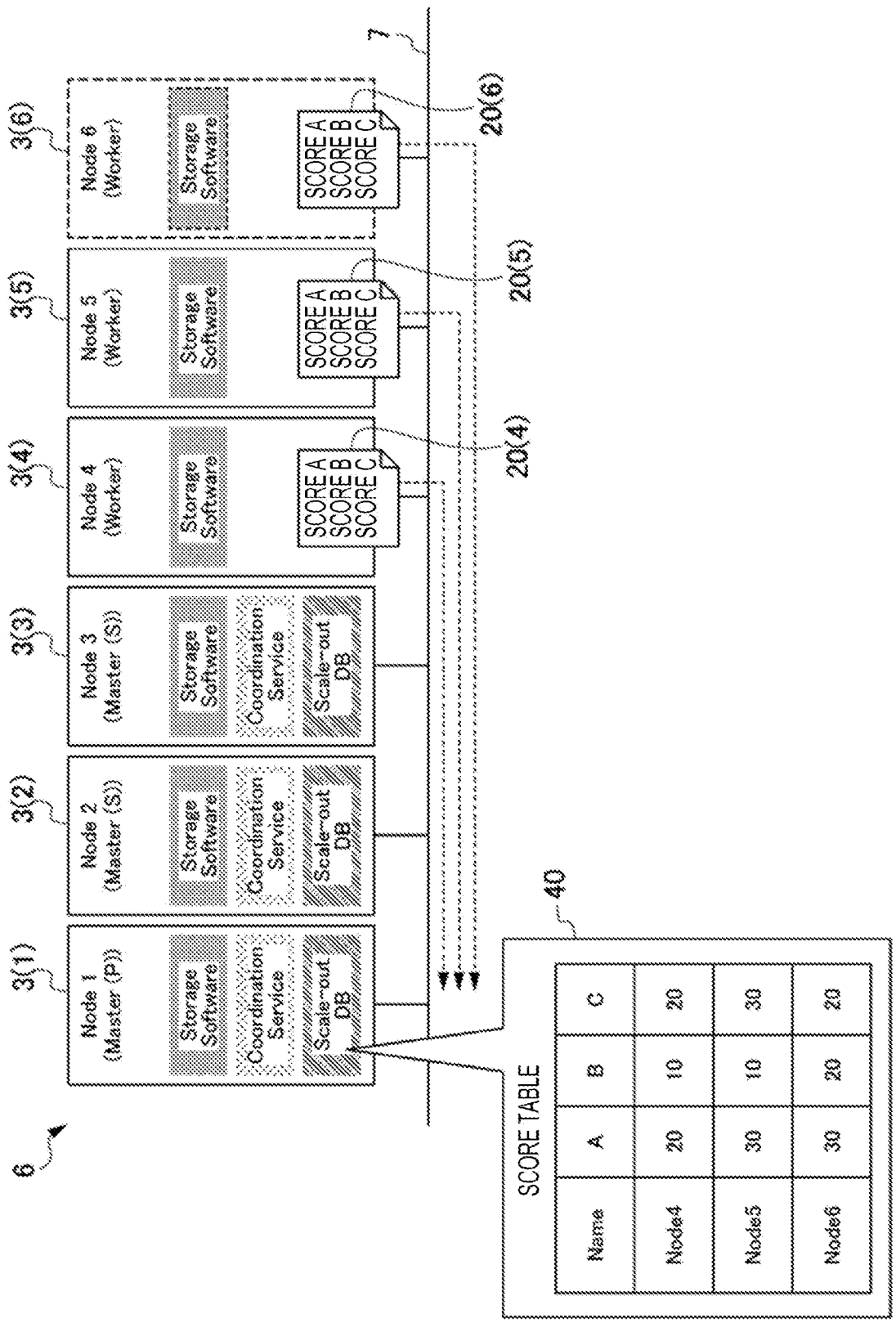
FIG. 6 is a diagram illustrating a configuration example of a master node and a worker node of a cluster according to the embodiment of the present invention.

FIG. 6 is a diagram illustrating a configuration example of a master node and a worker node of the cluster 6 according to the embodiment of the present invention.

The storage system 1 according to the present embodiment has a configuration in which a plurality of storage nodes 3 including the CPU 10, the memory 11, and the storage device 12 illustrated in FIG. 2 are coupled by an inter-node network 7. In addition, the cluster 6 is configured with a plurality of storage nodes 3 as master nodes and the remaining storage nodes 3 as worker nodes. The plurality of master nodes is configured with a certain degree of redundancy (for example, three or five).

The cluster 6 includes six storage nodes 3 (Node 1 to Node 6) similarly to the node configuration diagram (1) of FIG. 3. As illustrated in FIG. 6, the Node 1 to Node 3 are master nodes, and the Node 4 to Node 6 are worker nodes. At the time of initial installation of various programs on the storage node 3, the user designates a master node. Nodes not designated by the user are used as worker nodes. After completion of the initial installation, which of the storage nodes 3 in the cluster 6 is set as a master node and which is set as a worker node is managed by the scale-out DB of the master node. Note that the cluster 6 may include a smaller number than six or a larger number than six of the storage nodes 3.

All the nodes included in the cluster 6 are coupled by the inter-node network 7, and can communicate various data with each other via the inter-node network 7. The inter-node network 7 may be either the storage service network 4 or the back-end network 5 illustrated in FIG. 1.

Each of the Node 4 to Node 6 calculates a score as an initial score when the construction of the cluster 6 is completed. The score of each worker node calculated at the time of the initial construction of the cluster 6 is a similar value. Each worker node transmits a score, that is a total score of its own node, as score information 20(4) to 20(6) to the Node 1 that is the master node (P). The Node 1, that is the master node, writes the score information 20(4) to 20(6) received from all the worker nodes via the inter-node network 7 into a score table 40 in the scale-out DB, and manages the score of each worker node. In a case where the individual pieces of the score information 20(4) to 20(6) are not specified, reference numeral "20" is used. When a time during which a service is provided to the user by the cluster 6 becomes longer, a difference occurs in the score of each worker node.

The score table 40 is a table for the master node (P) to collectively manage scores of all the worker nodes. The score table 40 is managed by the scale-out DB of the master node (P). In the score table 40, a score calculated for each of classifications A, B, and C is stored for each worker node. Then, the master node of the Node 1 selects a worker node to be promoted to a master when a failure of the secondary node occurs, with reference to the score table 40. The storage node 3 as the master promotion candidate is a storage node (Node 4, Node 5, and Node 6) in which the coordination service and the scale-out DB are not set and there is a resource margin.

The scale-out DB of the master node (P) and the scale-out DB of the master node (S) always communicate with each other. Then, when information in the scale-out DB of the master node (P) is updated, the master node (S) is notified of the update content, and the information in the scale-out DB of the master node (S) is updated. Therefore, the scale-out DB of the master node (P) and the scale-out DB of the master node (S) have the same contents. This processing is the same for the coordination service of the master node (P) and the coordination service of the master node (S). Therefore, when the score table 40 included in the master node (P) is configured in the scale-out DB, all the master nodes may have the same score table 40 by copying the score table 40 to the master node (S). In this case, the master node (P) receives the score information 20 from the worker node, and reflects the score of the score information 20 in the score table 40. Thereafter, by copying the score table 40 to the master node (S), the score tables 40 of the master node (P) and the master node (S) are synchronized.

Figure 7:
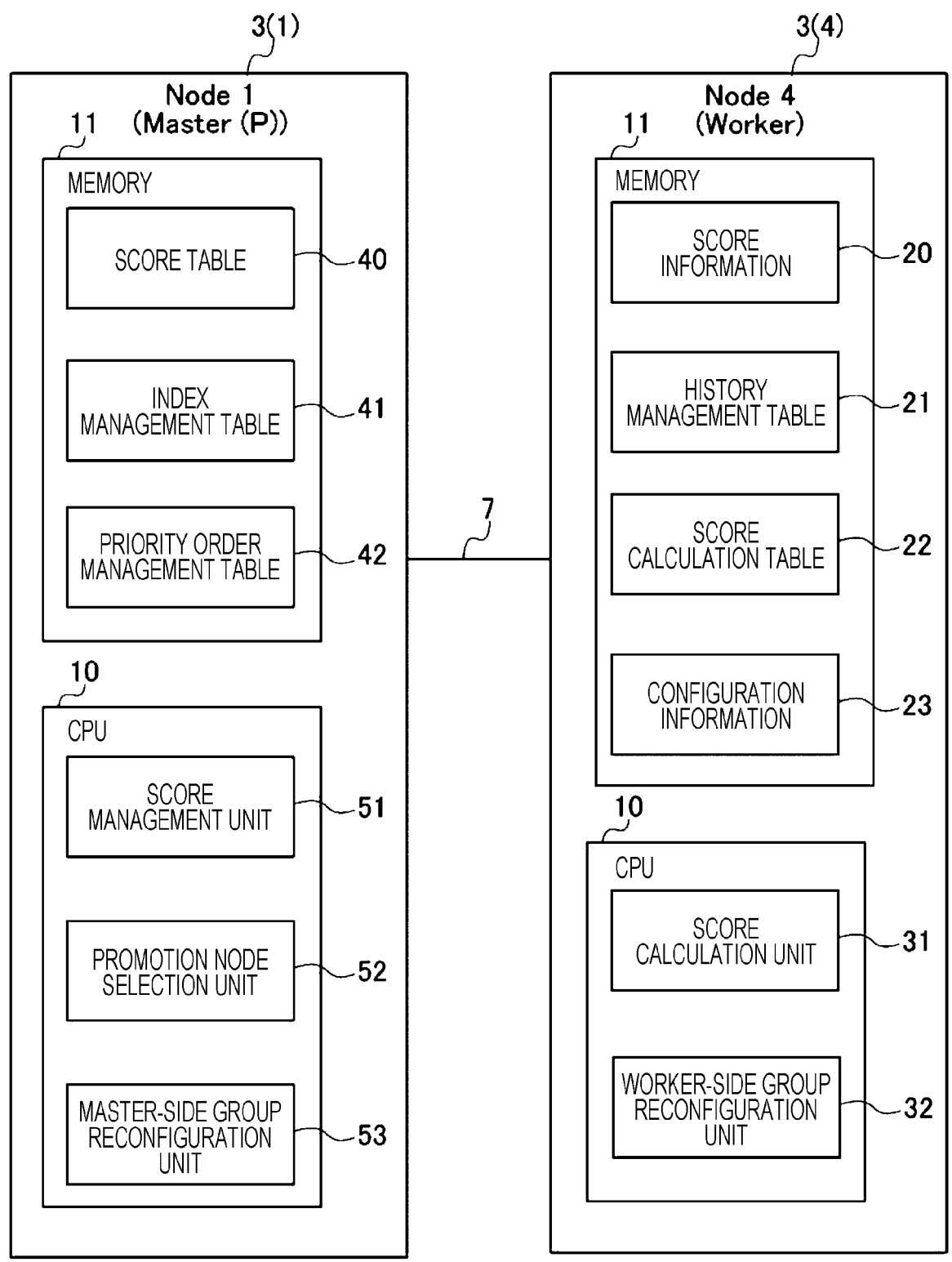
FIG. 7 is a block diagram illustrating an internal configuration example of the master node and the worker node according to the embodiment of the present invention.

FIG. 7 is a block diagram illustrating an internal configuration example of a master node and a worker node. FIG. 7 indicates an example of the Node 1 as a master node, and an example of the Node 4 as a worker node. The other master nodes have the same configuration as the Node 1, and the other worker nodes have the same configuration as the Node 4.

(Worker Node)

The memory 11 of a storage node 3(4) as a worker node includes score information 20, a history management table 21, a score calculation table 22, and configuration information 23. All of the score information 20, the history management table 21, the score calculation table 22, and the configuration information 23 are stored in the memory 11 of the worker node as a database or a file unique to the worker node. These pieces of information may be stored in the storage device 12 of the worker node.

The score information 20 is data that stores scores transmitted from the worker node to the master node (P) as described above. A detailed configuration example of the score information 20 is illustrated in FIG. 18 described later.

The history management table 21 is a table that manages history information such as a failure history and an operation history of the worker node itself. A detailed configuration example of the history management table 21 is illustrated in FIG. 16 described later.

The score calculation table 22 is referred to when the score calculation unit 31 calculates a score of its own node. The score calculation table 22 stores a score calculation formula for each index. A detailed configuration example of the score calculation table 22 is illustrated in FIG. 17 described later.

The configuration information 23 stores information such as specifications of the CPU 10 of the worker node itself, storage capacities of the memory 11 and the storage device 12, and programs installed in the worker node.

The CPU 10 of the worker node includes a score calculation unit 31 and a worker-side group reconfiguration unit 32. The storage software of the worker node (see FIG. 6) has a function of the score calculation unit 31. In addition, when being activated as the master node, the coordination service and the scale-out DB (see FIG. 11 to be described later) of the worker node have a function of the worker-side group reconfiguration unit 32.

The score calculation unit 31 calculates a score of the worker node based on the failure history and the operation status of the worker node. For example, the score calculation unit 31 calculates its own score as information with which the promotion node selection unit 52 of the master node can compare the failure history and the operation status of the worker node for each index classification obtained by classifying the index. The score can be calculated by applying the history information read from the history management table 21 by the score calculation unit 31 to the calculation formula of the score calculation table 22. After calculating the score, the score calculation unit 31 stores the score in the score information 20 and transmits the score information 20 to the Node 1 that is the master node (P).

The worker-side group reconfiguration unit 32 is activated to operate its own node as a master node according to an instruction of the promotion node selection unit 52, and reconfigures information necessary as the master node in synchronization with a master-side group reconfiguration unit 53. The worker-side group reconfiguration unit 32 activates the coordination service and the scale-out DB of its own node when its own node becomes a master promotion target. Then, by the function of the worker-side group reconfiguration unit 32 included in each of the coordination service and the scale-out DB of the own node, a group of the coordination service and a group of the scale-out DB in the cluster 6 are reconfigured as information necessary as the master node. As a result, the own node can operate as a master node.

(Master Node)

The memory 11 of a storage node 3(1) that is the master node (P) includes a score table 40, an index management table 41, and a priority order management table 42. These tables may be stored in the storage device 12 of the master node (P).

In the score table 40, scores extracted from the score information 20 are stored for each worker node and for each index classification. Then, the score table 40 collectively manages the scores of all the worker nodes configured in the cluster 6. The score in the score table 40 is added, deleted, or updated by the score management unit 51. A detailed configuration example of the score table 40 is illustrated in FIG. 15 described later.

The index management table 41 manages an index used for score calculation. A detailed configuration example of the index management table 41 is illustrated in FIG. 13 described later.

The priority order management table 42 is a table for managing a priority order of the index classification. A detailed configuration example of the priority order management table 42 is illustrated in FIG. 14 described later.

The CPU 10 of the master node (P) includes the score management unit 51, the promotion node selection unit 52, and the master-side group reconfiguration unit 53. The storage software (see FIG. 6) of the master node (P) has functions of the score management unit 51 and the promotion node selection unit 52. In addition, the coordination service and the scale-out DB (see FIG. 6) of the master node (P) have a function of the master-side group reconfiguration unit 53.

The score management unit 51 updates the score in the score table 40 based on the score information 20 received from the worker node. In addition, the score management unit 51 manages the score information 20 received from the worker node by the score table 40. The score management unit 51 can invalidate, from the score table 40, a score of a worker node from which the score information 20 cannot be received for a predetermined time or more due to a network failure illustrated in FIG. 8 to be described later, for example.

The promotion node selection unit 52 selects a worker node to be promoted to a master node when the number of master nodes cannot ensure the redundancy. For example, when a failure occurs in one of the master nodes configuring the cluster 6, the promotion node selection unit 52 compares scores for each worker node, and selects, based on the scores, a worker node to be promoted to a master node instead of the master node in which a failure has occurred. Here, the promotion node selection unit 52 refers to the index management table 41 and the priority order management table 42, compares scores for each worker node stored in the score table 40, and selects a worker node having a highest score.

The master-side group reconfiguration unit 53 removes the master node in which a failure has occurred from the cluster node, promotes the worker node selected by the promotion node selection unit 52 to the master node, and demotes the master node in which a failure has occurred from the master. The master-side group reconfiguration unit 53 reconfigures the group of the coordination service and the group of the scale-out DB in the cluster 6 by updating the information on the storage node managed as the master node based on the information on the worker node to be promoted to the master node. Reconfiguring the group of the coordination service and the group of the scale-out DB in the cluster 6 is also referred to as "reconstructing the cluster 6".

Next, an outline of processing of each node performed in the cluster 6 of the storage system 1 and a change in the score of the score table 40 will be described with reference to each drawing.

<Score Table at Time of Communication Abnormality>

Figure 8:
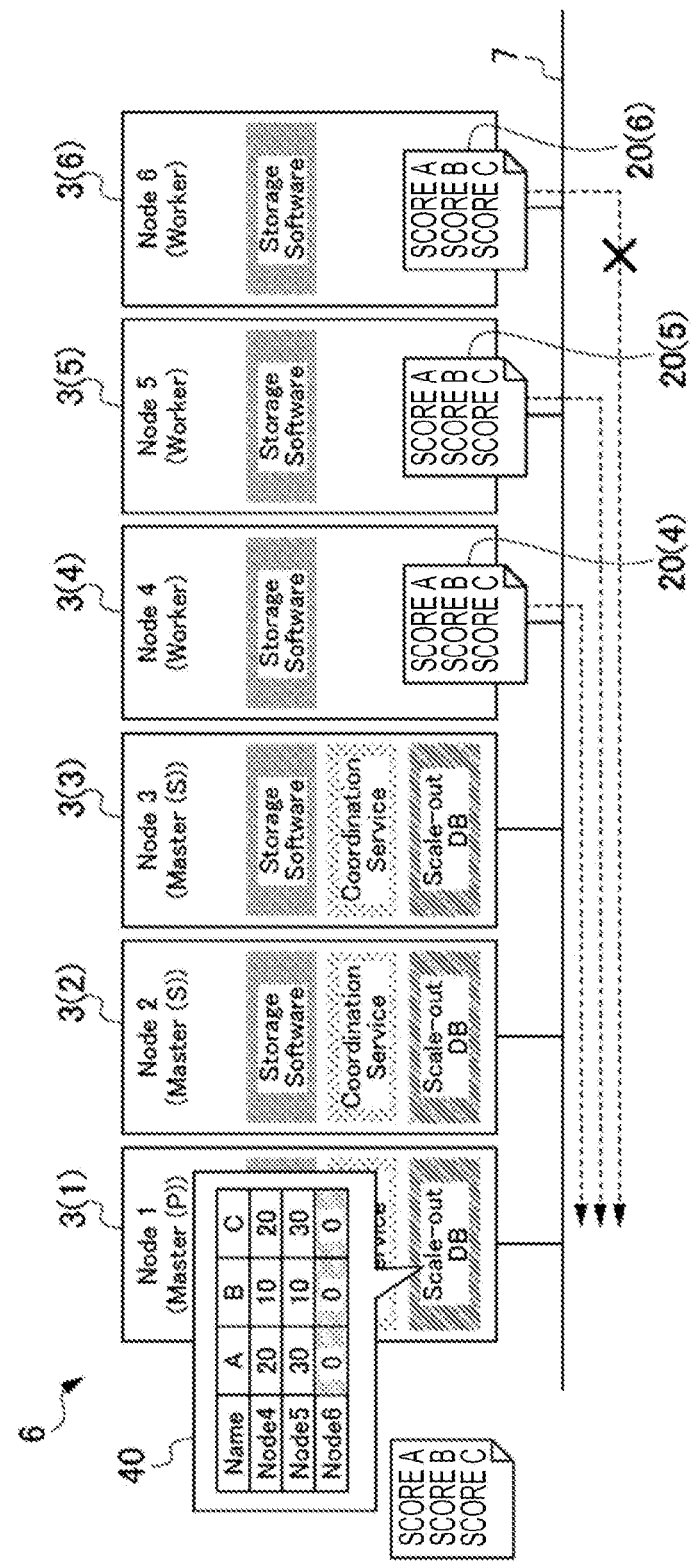
FIG. 8 is a diagram illustrating an example of scores set in a score table at the time of communication abnormality according to the embodiment of the present invention.

FIG. 8 is a diagram illustrating an example of scores set in the score table 40 at the time of communication abnormality. In FIG. 8, it is assumed that a failure of network disconnection occurs in the Node 6, and the master node (P) and the Node 6 cannot communicate with each other.

As illustrated in FIG. 6, the score of each worker node is managed in the score table 40 of the Node 1 that is the master node (P). The score calculation is executed periodically or at a timing when the configuration information of the cluster 6 is changed, in addition to the time when the construction of the cluster 6 is completed. In addition, the score calculation unit 31 calculates the score per node for each classification. After the score is calculated, the score information 20 is transmitted to the master node (P).

The Node 1, that is the master node (P), updates the score table 40 in the scale-out DB when receiving the score information 20 from the worker node. In FIG. 8, the Node 1 is in a state in which it cannot receive the score information 20 from the Node 6 due to the failure of network disconnection occurring in the Node 6. Therefore, when detecting that there is a worker node from which the score information 20 cannot be received, the score management unit 51 of the Node 1 sets the score stored in the score table 40 of the worker node to "0". The worker node whose score is set to "0" is temporarily excluded from candidates for master promotion. Therefore, the master promotion candidates that can be selected by the promotion node selection unit 52 are only the worker nodes of the Node 4 and the Node 5 from which the Node 1 can receive the score information 20.

<Fault Domain>

Figure 9:
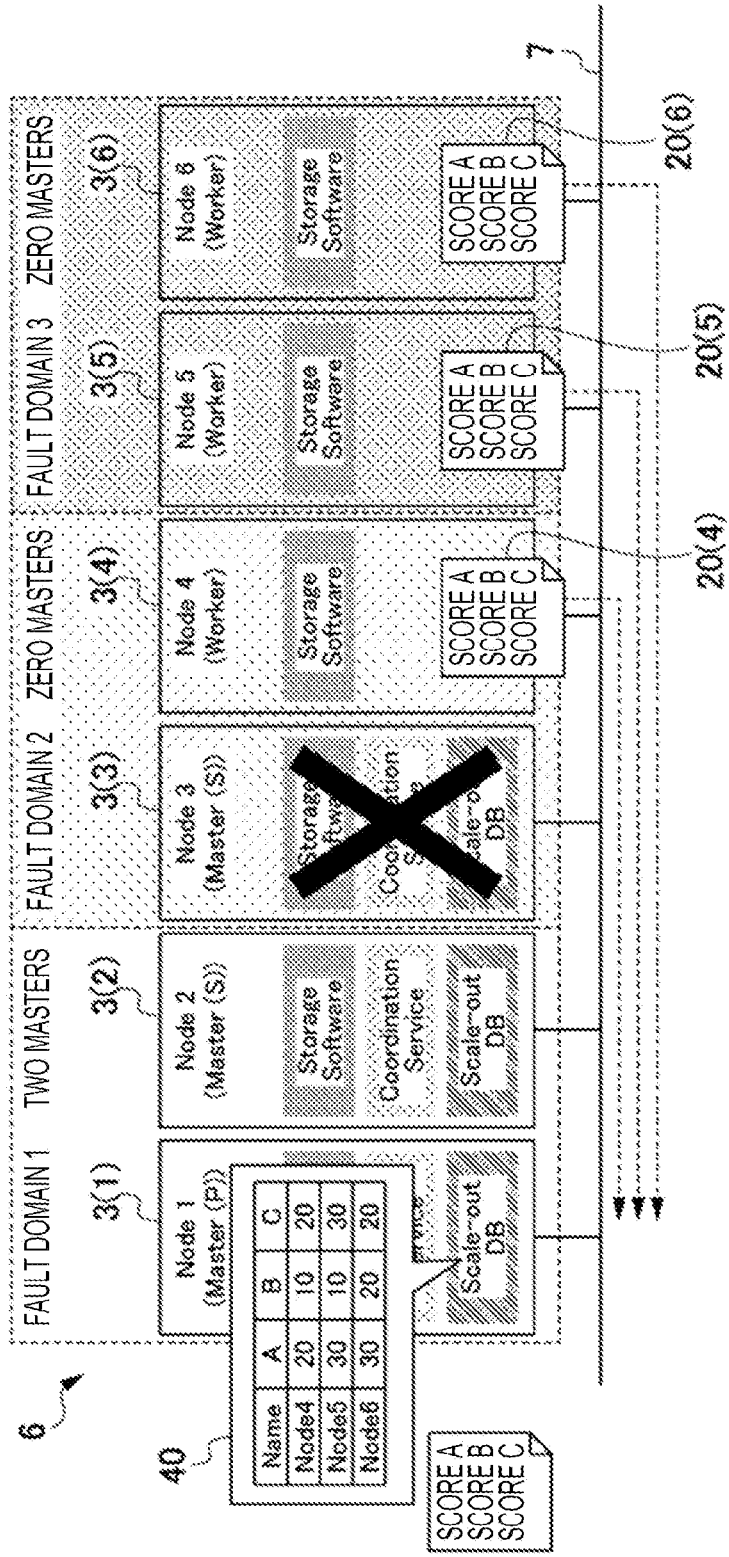
FIG. 9 is a diagram illustrating a method of setting a fault domain when a failure occurs in the master node according to the embodiment of the present invention.

FIG. 9 is a diagram illustrating a method of setting a fault domain when a failure occurs in the master node.

The fault domain is a group set for each of a plurality of storage nodes sharing at least one of a power supply system and a network switch. In FIG. 9, a configuration is adopted in which two master nodes are included in a fault domain 1, but this example assumes a case where the user can freely set the configuration at the time of initial installation. The promotion node selection unit 52 illustrated in FIG. 7 selects a worker node to be promoted to a master node in units of the fault domain. For example, in master promotion processing, that is internal processing of the cluster 6, the master nodes are arranged in a distributed manner so as not to share a failure point in any grouping. The promotion node selection unit 52 sets a worker node included in a fault domain 3 that does not share the failure point with the Node 3 in which a failure has occurred as a candidate for master promotion.

FIG. 9 illustrates an example in which fault domains 1, 2, and 3 are set for each two nodes. For example, the fault domain 1 is configured by grouping the Node 1 and the Node 2. The fault domain 2 is configured by grouping the Node 3 and the Node 4. The fault domain 3 is configured by grouping the Node 5 and the Node 6.

The promotion node selection unit 52 of the Node 1 that is the master node (P) calculates the number of master nodes for each fault domain. However, in this calculation, the node in which a failure has occurred is not counted. As a result, the number of master nodes in which the failure of the fault domain 1 has not occurred is calculated to be two. In addition, the number of worker nodes in which the failure of the fault domain 3 has not occurred is calculated to be two. On the other hand, since the failure has occurred in the Node 3, the number of master nodes in which the failure of the fault domain 2 has not occurred is calculated to be one.

The promotion node selection unit 52 operating in the Node 1 selects a worker node to be promoted to a master node from the worker nodes included in the fault domain having a smallest number of master nodes. When the number of master nodes in the plurality of fault domains is 0, the promotion node selection unit 52 may set the plurality of fault domains as a selection range of the worker node to be promoted to the master node.

As described above, since the fault domain shares the power supply system and the network switch, for example, in a case where a hardware failure occurs in the Node 3, it is expected that a voltage fluctuation affects the Node 4 due to repair or removal of the Node 3. In such a case, the promotion node selection unit 52 may lower the priority order of the Node 4 even when the score of the Node 4 is the highest among the worker nodes. When a plurality of master nodes is arranged in one fault domain, an influence of a failure occurring in any of the master nodes is propagated to other master nodes in the same fault domain. Therefore, the promotion node selection unit 52 distributedly arranges the master nodes in different fault domains, thereby preventing the influence of the failure occurring in any node from being propagated to other nodes.

<Worker Selection Processing>

Figure 10:
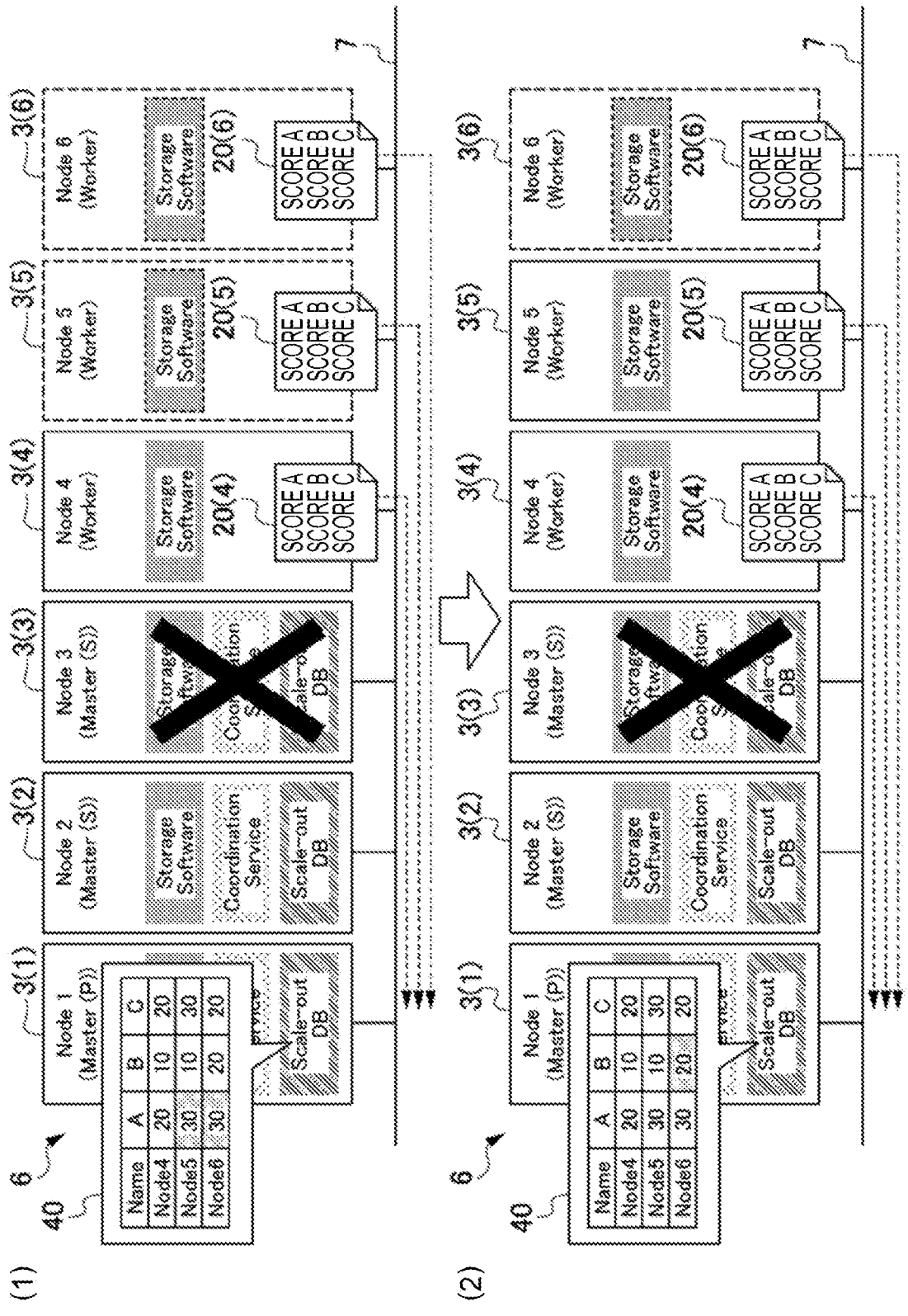
FIG. 10 is a diagram illustrating an example of worker node selection processing according to the embodiment of the present invention.

FIG. 10 is a diagram illustrating an example of worker node selection processing. The worker node selection processing is performed in two stages when a failure occurs in the master node.

(First Stage of Selection Processing)

A node configuration diagram (1) of FIG. 10 illustrates a state of a first stage of the worker node selection processing. The promotion node selection unit 52 of the Node 1, that is the master node (P), selects the worker node having the highest score as a master promotion destination based on the score table 40 stored in the scale-out DB of its own node. However, the score of classification A stored in the score table 40 is "30" which is the same in the Node 5 and the Node 6. Note that in a case where a failure occurs in the master node (P), after the master promotion for promoting the master node (S) to the primary is performed, the worker node selection processing is started.

(Second Stage of Selection Processing)

A node configuration diagram (2) of FIG. 10 illustrates a state of a second stage of the worker node selection processing. The scores are classified by priority, and comparison processing is performed from top scores. The promotion node selection unit 52 compares scores for each index classification and for each of a plurality of worker nodes according to the priority order defined in the index classification. Then, in a case where the scores of the index classification having a higher priority order have a same value among the plurality of worker nodes, the promotion node selection unit 52 repeats the processing of comparing the scores having the score of the index classification having a second highest priority order and selects a worker node with the same index classification and a high score. For example, when scores of one classification are equal (equal or close), scores of another classification having a lower priority are used for comparison. As described above, the scores of classification A are the same for the Node 5 and the Node 6, so the scores for classification B are then compared.

Figure 11:
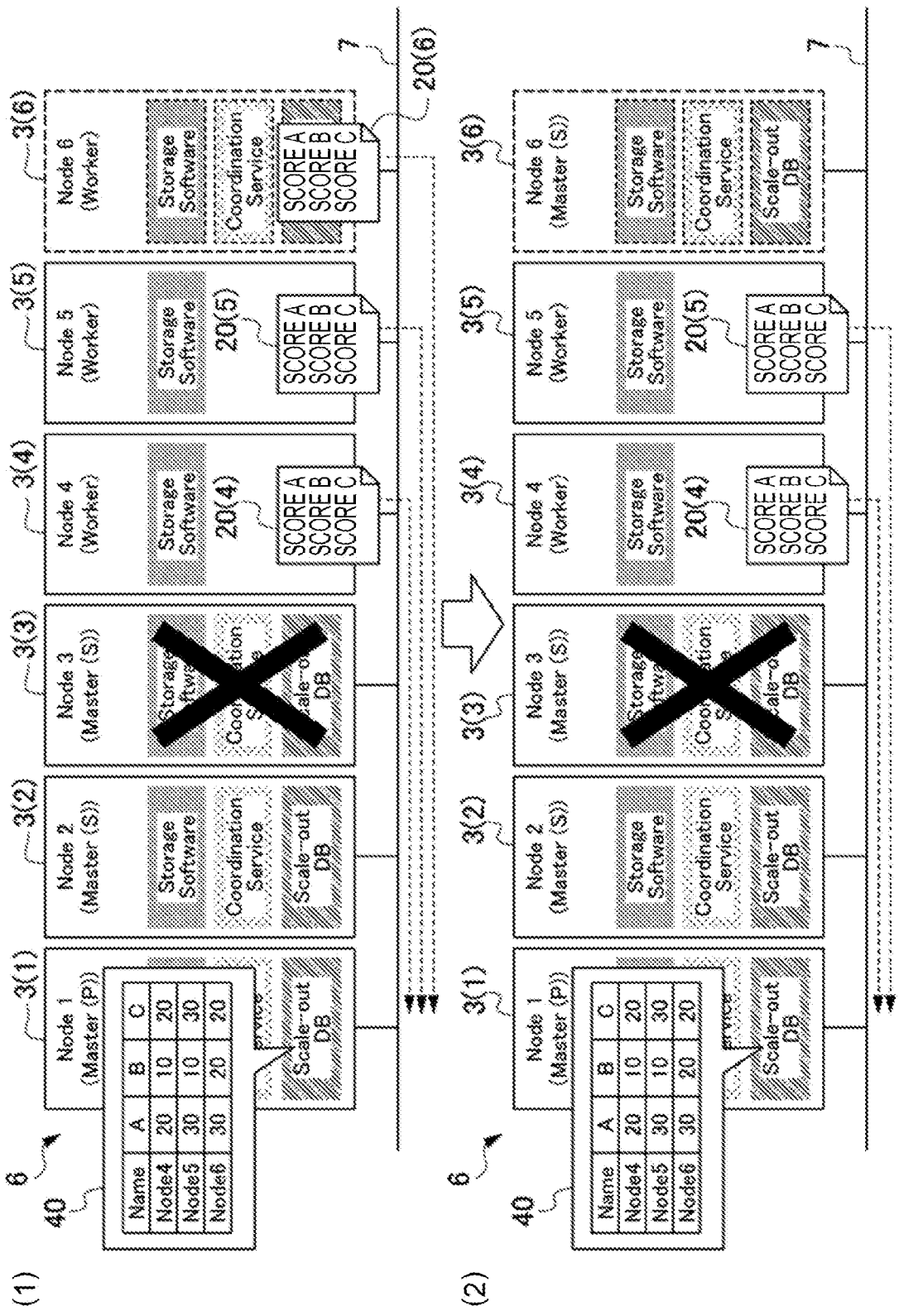
FIG. 11 is a diagram illustrating an example of master promotion of a worker node and group reconfiguration processing according to the embodiment of the present invention.

FIG. 11 is a diagram illustrating an example of the master promotion of the worker node and group reconfiguration processing. A state in which the group of the coordination service and the group of the scale-out DB are reconfigured after the worker node is promoted to the master is illustrated.

A node configuration diagram (1) of FIG. 11 illustrates a state in which the coordination service and the scale-out DB are activated in the Node 6 of the worker node selected as the master promotion destination. The Node 6 is ready for the master promotion by activating the coordination service and the scale-out DB.

A node configuration diagram (2) of FIG. 11 illustrates a state of group reconfiguration. The group of the coordination service activated in the Node 6 is reconfigured by the worker-side group reconfiguration unit 32. The group of the coordination service is a set of master nodes that control the cooperative operation, and all the master nodes correspond thereto. By the group reconfiguration of the coordination service, the master node in which a failure has occurred is excluded from the group of the coordination service, and a node as the master promotion destination is added to the group of the coordination service.

In addition, the group of the Scale-out DB is also reconfigured by the worker-side group reconfiguration unit 32. The group of the scale-out DB is a set of master nodes that operate the scale-out DB, and all the master nodes correspond thereto. By the group reconfiguration of the scale-out DB, the master node in which a failure has occurred is excluded from the group of the scale-out DB, and a node as the master promotion destination is added to the group of the scale-out DB.

Figure 12:
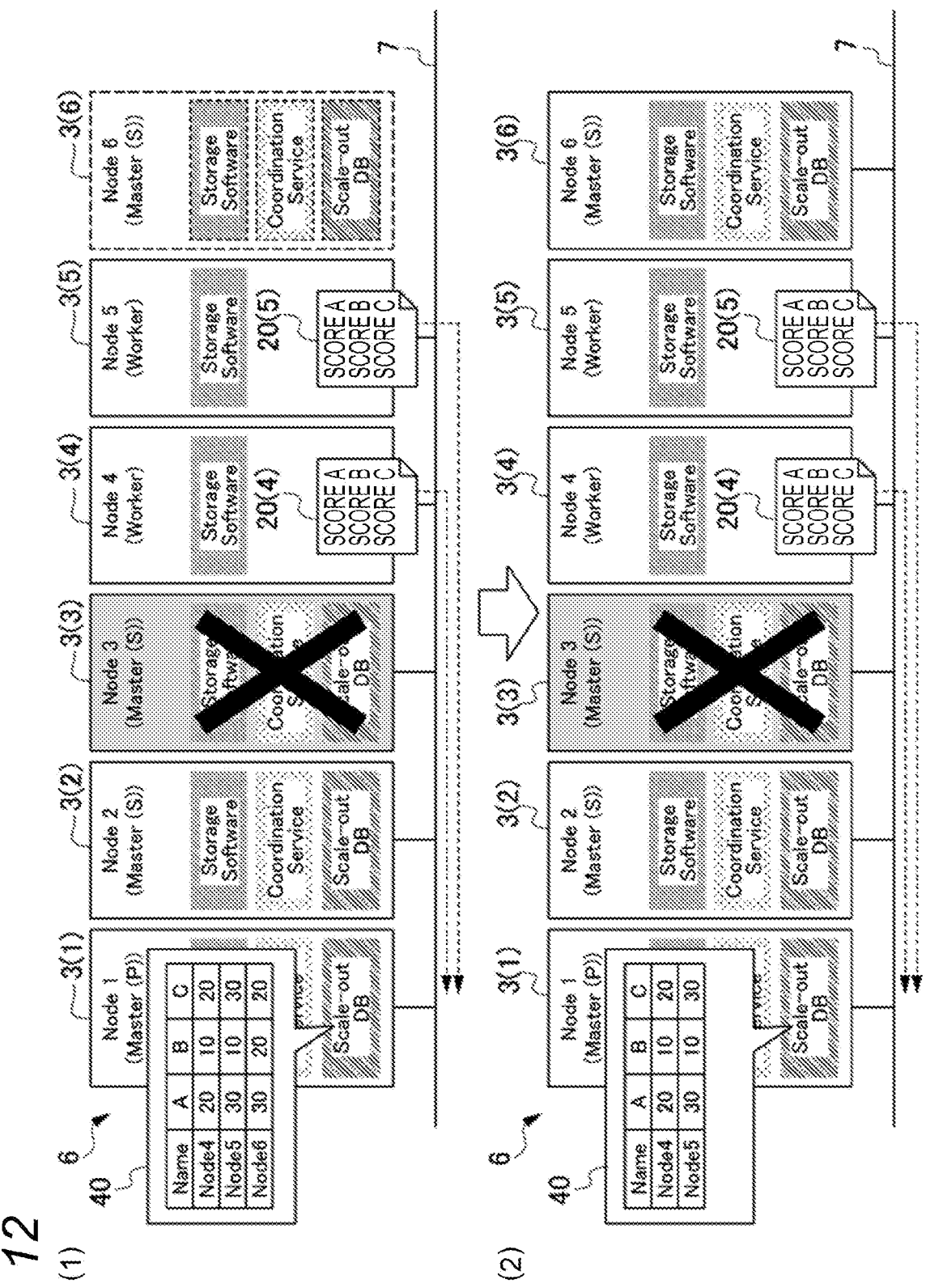
FIG. 12 is a diagram illustrating an example of master demotion and score table update processing according to the embodiment of the present invention.

FIG. 12 is a diagram illustrating an example of master demotion and update processing of the score table 40. Here, a state in which the score table 40 is updated after the Node 3 is demoted from the master is indicated.

A node configuration diagram (1) of FIG. 12 illustrates a state in which the Node 3, that is a master node in which a failure has occurred, is demoted from the master. When the Node 3 is demoted from the master by the promotion node selection unit 52, the coordination service and the scale-out DB operating in the Node 3 are stopped.

A node configuration diagram (2) of FIG. 12 illustrates a state in which the Node 1, that is the master node (P), updates the score table 40. As described above, when the Node 3 is demoted from the master and the Node 6 is promoted to the master, the score management unit 51 of the Node 1 deletes an entry of the Node 6 as the master promotion destination from the score table 40. Thereafter, the cluster 6 operates with a new configuration. Note that the node of the Node 3 is repaired or replaced and then incorporated into the cluster 6 again. In this case, the node of the Node 3 operates as a worker node, and the score management unit 51 of the Node 1 stores the score of the Node 3 in the score table 40.

So far, a mode has been described in which the master node (P) collects the score information 20 from each worker node and manages the score, and controls the master promotion when a failure occurs in the master node (S). When a failure occurs in the master node (P) itself, processing of selecting a new master node (P) from among the master nodes(S) is executed before executing the master promotion processing. Thereafter, the newly selected master node (P) leads the master promotion processing.

FIG. 13 is a diagram illustrating an example of the index management table 41. The index management table 41 is a table for managing an index associated with a failure and an operation status of a worker node. Although the master node itself does not calculate the score, a calculation method that is referred to when the score calculation unit 31 of the worker node calculates the score will be added to the index management table 41 and described.

The index management table 41 includes items of an index name, an index classification, a description, and a calculation method.

In the index name item, a name of a failure occurring in the worker node, a name of an index representing an operation status, and the like of the worker node are stored.

The index classification item stores an index classification obtained by classifying types of indexes. The index classification includes at least one of a main body failure that is an index of a failure history of a worker node, a network failure that is an index of a failure history of a network to which the worker node is coupled, an operating time that is an index related to an operation of the worker node, and a virtualization status that is an index related to a status of a virtualization environment of the worker node. Here, as the index classification, for example, four types of "A: main body failure", "B: network (NW) failure", "C: operating time", and "D: virtualization status" will be assumed and described.

In the description item, a description for each index is stored. The description item is provided to help understanding in the present specification, and the description item is unnecessary in the actual index management table 41.

In the calculation method item, a calculation method for each index is stored.

Next, the index name, the index classification, the description, and the calculation method stored in the index management table 41 will be sequentially described.

(#1: User Data Drive Failure)

The index classification of a user data drive failure is "A: main body failure", and the description is "reflecting, in a score, a failure history of a drive that stores user data". The calculation method is obtained as follows when an average value of a number of times of drive blockage per month is x.

$x=0$ . . . score=3

$0<x\leq$one time . . . score=2

One time$<x\leq$five times . . . score=1

Five times$\leq x$ . . . score=0

(#2: Node Blockage)

The index classification of a node blockage is "A: main body failure", and the description is "reflecting, in the score, a history of inoperability as a node due to a software failure or a hardware failure". The calculation method is obtained as follows when an average value of a number of times of a node blockage per month is x.

$0=0$ . . . score=3

$0<x\leq$three times . . . score=2

Three times$<x\leq 10$ times . . . score=1

10 times$\leq x$ . . . score=0

(#3: Compute Network Failure)

The index classification of a compute network failure is "B: NW failure", and the description is "reflecting, in the score, a number of times of retransmission request of data transmission related to reading and writing of user data". The calculation method is obtained as follows when an average value of a number of times of retransmission request per read/write (IO: input/output) of user data is x.

x<10 . . . score=3

10 times<x≤100 times . . . score=2

100 times<x≤700 times . . . score=1

700 times<x . . . score=0

(#4: Inter-Node Network Failure)

The index classification of an inter-node network failure is "B: NW failure", and the description is "reflecting, in the score, a number of times of retransmission request of the inter-node communication". The calculation method is obtained as follows when an average value of a number of times of retransmission request per inter-node communication is x.

x=0 . . . score=2

0<x≤one time . . . score=1

Three times<x≤ . . . score=0

(#5: Management Network Failure)

The index classification of a management network failure is "B: NW failure", and the description is "reflecting, in the score, a number of times of retransmission request of communication related to a management operation from the user". The calculation method is obtained as follows when an average value of the number of times of retransmission request per communication for a management operation is x.

x=0 . . . score=2

0<x≤one time . . . score=1

Three times<x≤ . . . score=0

(#6: Operating Time of Physical Server on which Node is Operating)

The index classification of an operating time of the physical server on which the node is operating is "C: operating time", and the description is "reflecting, in the score, a short operating time of the node". The calculation method is obtained as follows when an average value of the operating time is x.

x⊏{initial failure period} . . . score=1 x⊏{accidental failure period} . . . score=2 x⊏{wear failure period} . . . score=0

(#7: Operating Time of Drive on Physical Server)

The index classification of an operating time of the drive on the physical server is "C: operating time", and the description is "reflecting, in the score, a short operating time of the drive". The calculation method is obtained as follows when an average value of the operating time is x.

x⊏{initial failure period} . . . score=1 x⊏{accidental failure period} . . . score=2 x⊏{wear failure period} . . . score=0

(#8: Sharing Status of (Virtualization Environment) Resource)

The index classification of a sharing status of a (virtualization environment) resource is "D: virtualization status", and the description is "reflecting, in the score, a processing time taken by another virtual machine (VM) sharing a physical CPU". The calculation method is obtained as follows in a case where an average value of a time ratio in which the VM waits for CPU allocation in a certain period is x.

x≤10% . . . score=2

10%<x≤30% . . . score=1

30%<x . . . score=0

FIG. 14 is a diagram illustrating an example of a priority order management table 42. A priority order of an index management table is stored in the priority order management table 42. The priority order management table 42 is used when the score management unit 51 of the master node (P) compares the scores according to the priority order of the index classification.

The priority order management table 42 includes items of an index classification and an example of a motivation for changing the priority order of the index classification.

The index classifications A to D described above are stored in the index classification items.

In the item of the example of the motivation for changing the priority order of the index classification, a condition when the priority order is changed is stored. Hereinafter, an example of the motivation for changing the priority order for each index classification will be described.

In a case where the index classification is "A: main body failure", the motivation for changing the priority order is "since it is a failure history for a fundamental function as a storage node, it is assumed that comparison is always performed with a high priority".

In a case where the index classification is "B: NW failure", the motivation for changing the priority order is "when the management of a network infrastructure depends on a cloud service side and it is not considered important, the priority order of "B: NW failure" is lowered".

In a case where the index classification is "C: operating time", the motivation for changing the priority order is "when the operating time is not important because replacement of the server is performed at short intervals, the priority order of "C: operating time" is lowered".

In a case where the index classification is "D: virtualization status", the motivation for changing the priority order is "when the cluster is constructed in a virtualization environment but constructed with separate hardware resources, the priority order of "D: virtualization status" is lowered". However, when it is an on-premises environment, this index classification "D" is not used. For example, in a case where an operation is performed on a bare metal server (physical server) or a virtual machine is operated for each node on the server, but each virtual machine does not share the hardware resource of the server, the priority of "D: virtualization status" is lowered.

FIG. 15 is a diagram illustrating an example of the score table 40. Here, it is assumed that a worker node ID for identifying a worker node is identified by an alphabetic character such as a Node_A to a Node_D instead of a number such as a Node 1.

The score table 40 includes items of a worker node ID, a score of an index classification A, a score of an index classification B, a score of an index classification C, a score of an index classification D, a last update time, and an updater node ID. The score table 40 stores a score for each index classification calculated for each worker node ID. In addition, the updater node ID indicates that the updater node ID is a Node E and the time when the Node E has last updated the score.

FIG. 16 is a diagram illustrating an example of the history management table 21. The history management table 21 is a table used by the worker node to hold a history related to a failure of its own node.

The history management table 21 includes items of an index name, a history, and a last update time.

In the item of the index name, the same name as the index name of the index management table 41 illustrated in FIG. 13 is stored.

In the item of the history, measurement values of various indexes to be a basis of score calculation by the score calculation unit 31, such as a history of a failure occurring in the worker node and a history representing a usage status of the worker node (operating time, a sharing status of a resource, and the like) are stored.

In the item of the last update time, the time when the history management table 21 is updated is stored for each index.

FIG. 17 is a diagram illustrating an example of the score calculation table 22. The score calculation table 22 is used by the score calculation unit 31 of the worker node to calculate the score of its own node.

The score calculation table 22 includes items of an index name, an index classification, and a calculation method. The score calculation table 22 is obtained by selecting each item of the index name, the index classification, and the calculation method from the index management table 41 illustrated in FIG. 13, and has the same content, and thus a detailed description thereof will be omitted.

The worker node can calculate the score of its own node for each index by using the score calculation table 22.

Here, a specific example of processing of calculating according to the score calculation table 22 based on the history information of the history management table 21 illustrated in FIG. 16 will be described. In a column of the calculation method, a result calculated by each index is surrounded by a broken line.

In the history management table 21, since the history of the user data drive failure is "0", the formula of x=0 is satisfied, and the score is calculated as "3".

Similarly, since the history of the node blockage is "1", the formula of 0<x≤three times is satisfied, and the score is calculated as "2".

Since the history of the compute network failure is "20", the formula of 10 times<x≤100 times is satisfied, and the score is calculated as "2".

Since the history of the inter-node network failure is "0", the formula of x=0 is satisfied, and the score is calculated as "2".

Since the history of the management network failure is "4", the formula of three times<x is satisfied, and the score is calculated as "0".

Since the history of the operating time of the physical server on which the node is operating is "1200", the formula of x ⊂ {accidental failure period} is satisfied, and the score is calculated as "2".

Since the history of the operating time of the drive on the physical server is "1400", the formula of x ⊂ {wear failure period} is satisfied, and the score is calculated as "0".

Since the history of the sharing status of the (virtualization environment) resource is "20", the formula of 10%<x≤30% is satisfied, and the score is calculated as "1".

Based on these calculation results, the score calculation unit 31 calculates a total score of the index classification A as "5", a total score of the index classification B as "4", a total score of the index classification C as "2", and a total score of the index classification D as "1".

FIG. 18 is a diagram illustrating an example of the score information 20. The score calculation unit 31 generates the score information 20 storing the total score for each index classification. The score information 20 is transmitted to the master node (P) by the worker node whose transmitter node ID is the Node_A.

The score information 20 includes items of a transmitter node ID, a score of an index classification A, a score of an index classification B, a score of an index classification C, and a score of an index classification D.

The score for each index classification is calculated by the worker node specified by the transmitter node ID. Then, the master node (P) collects the score information 20 from each worker node included in the cluster 6. Since the transmitter node ID is added to the score information 20, the master node (P) replaces the transmitter node ID with a worker node and stores the score in the score table 40.

<Example of Storage Management Method>

Next, an example of a storage management method performed in the cluster 6 of the storage system 1 will be described with reference to FIGS. 19 to 22.

(Processing Related to Score Calculation)

First, an example of processing related to score calculation will be described with reference to FIGS. 19 and 20.

Figure 19:
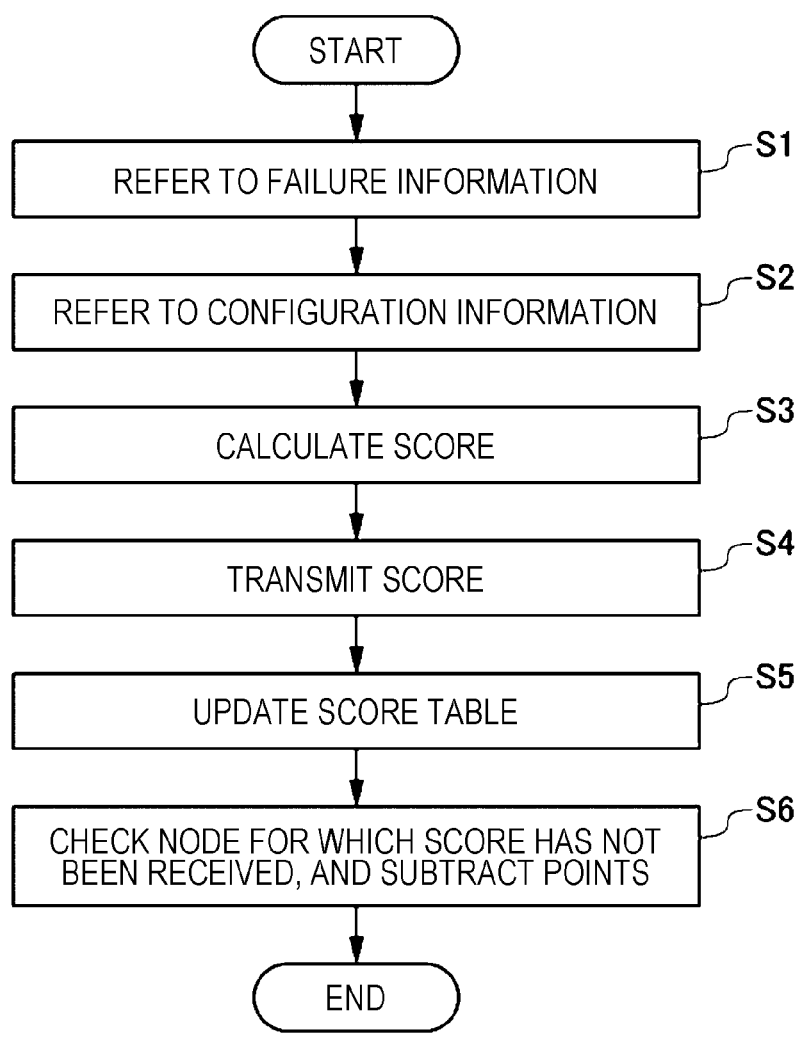
FIG. 19 is a flowchart illustrating an example of processing related to score calculation according to the embodiment of the present invention.

FIG. 19 is a flowchart illustrating an example of processing related to score calculation.

Figure 20:
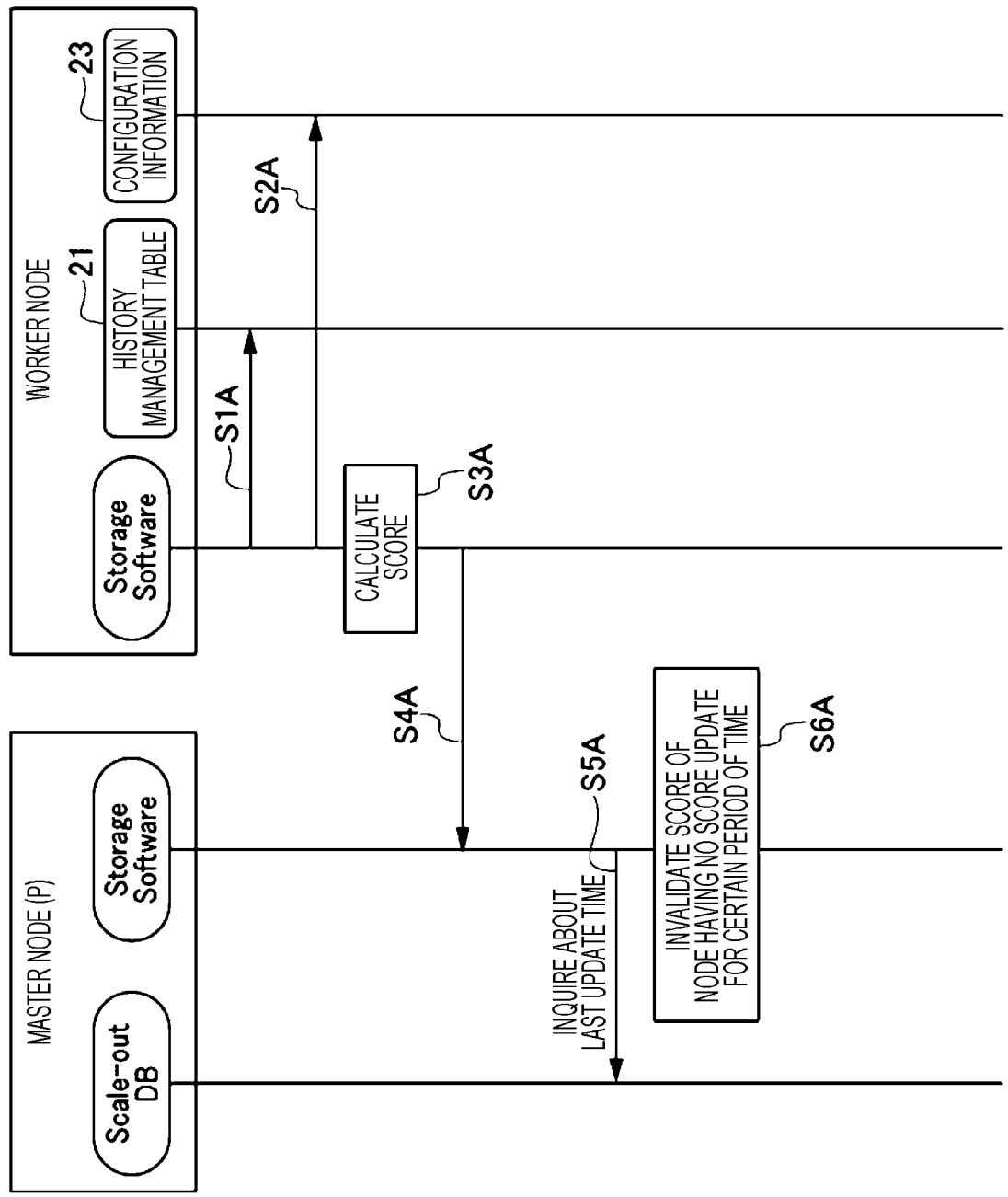
FIG. 20 is a sequence diagram illustrating a relationship between processing of a master node (P) and processing of a worker node according to the embodiment of the present invention.

FIG. 20 is a sequence diagram illustrating a relationship in processing between a master node (P) and a worker node. A reference sign of each processing step illustrated in FIG. 20 is associated with each processing step illustrated in FIG. 19.

First, the score calculation unit 31 of the worker node refers to the history management table 21 (S1 in FIG. 19). At this time, the storage software of the worker node acquires information such as a failure history and an operation history of its own node from the history management table 21 (S1A in FIG. 20).

Next, the score calculation unit 31 refers to the configuration information 23 (see FIG. 7) of its own node stored in the memory 11 (see FIG. 2) (S2 in FIG. 19). At this time, the storage software of the worker node acquires the configuration information 23 of its own node (S2A in FIG. 20).

Next, the score calculation unit 31 calculates a score of its own node with reference to the score calculation table 22 (S3 in FIG. 19). At this time, the storage software of the worker node calculates the score of its own node based on the failure history, the operation history, and the configuration information 23 of its own node that have been referred to (S3A in FIG. 20).

Next, the score calculation unit 31 transmits the calculated score of its own node to the master node (P) (S4 in FIG. 19). At this time, the storage software of the worker node transmits the calculated score of its own node to the storage software of the master node (P) (S4A in FIG. 20).

Next, the score management unit 51 of the master node (P) updates the score table 40 (S5 in FIG. 19). At this time, the storage software of the master node (P) inquires of the scale-out DB about a last update time of the score table 40 (S5A in FIG. 20).

Next, the score management unit 51 checks a node for which a score has not been received, and subtracts points from the score of a node having a problem (S6 in FIG. 19), and ends this processing. At this time, the storage software of the master node (P) invalidates the score of the node having no score update for a certain period of time (S6A in FIG. 20).

(Processing from Failure Occurrence to Master Promotion Completion)

Next, an example of processing from a failure occurrence to a master promotion completion will be described with reference to FIGS. 21 and 22.

Figure 21:
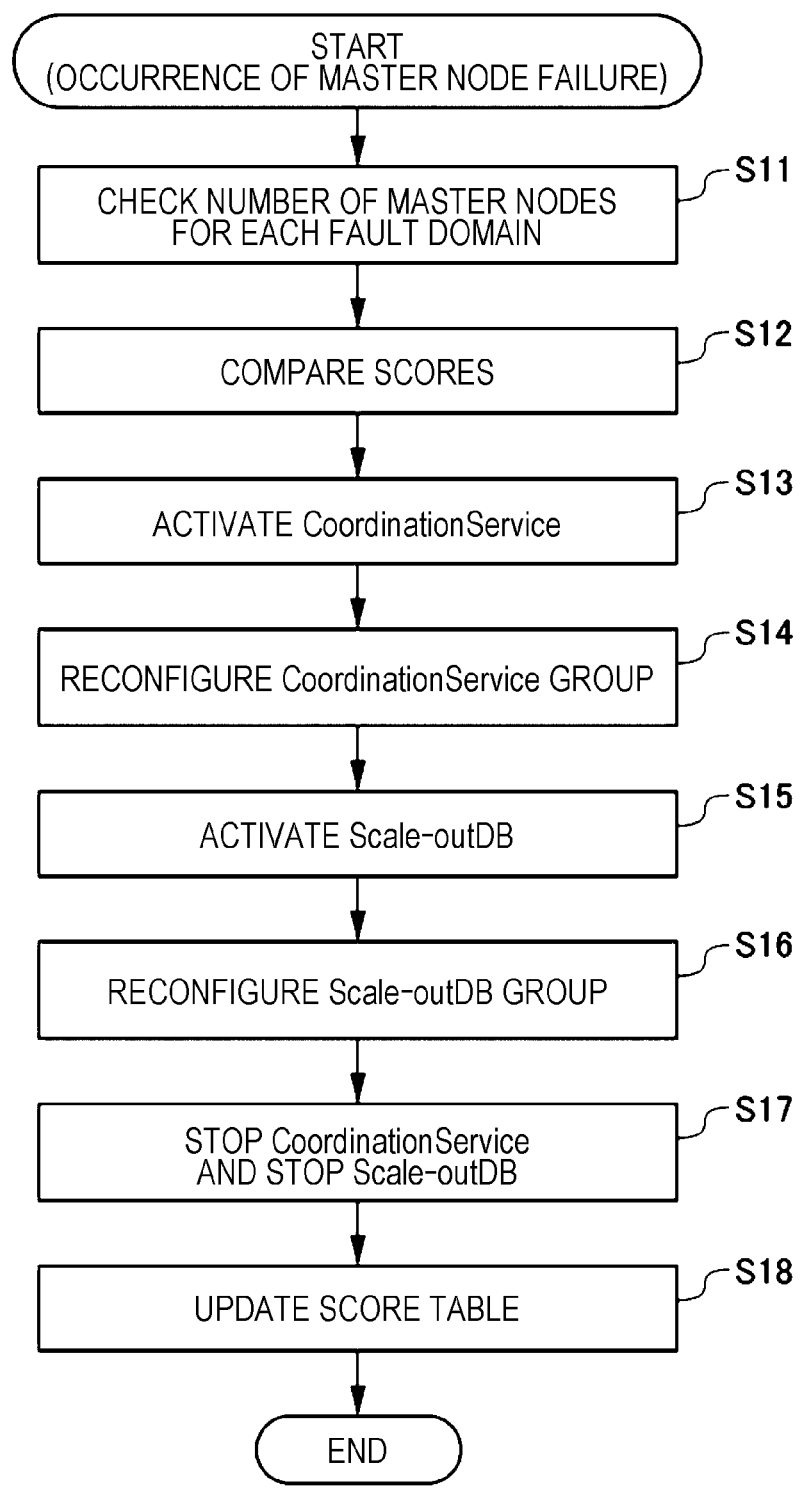
FIG. 21 is a flowchart illustrating an example of processing from failure occurrence to master promotion completion according to the embodiment of the present invention.

FIG. 21 is a flowchart illustrating an example of processing from a failure occurrence to a master promotion completion.

Figure 22:
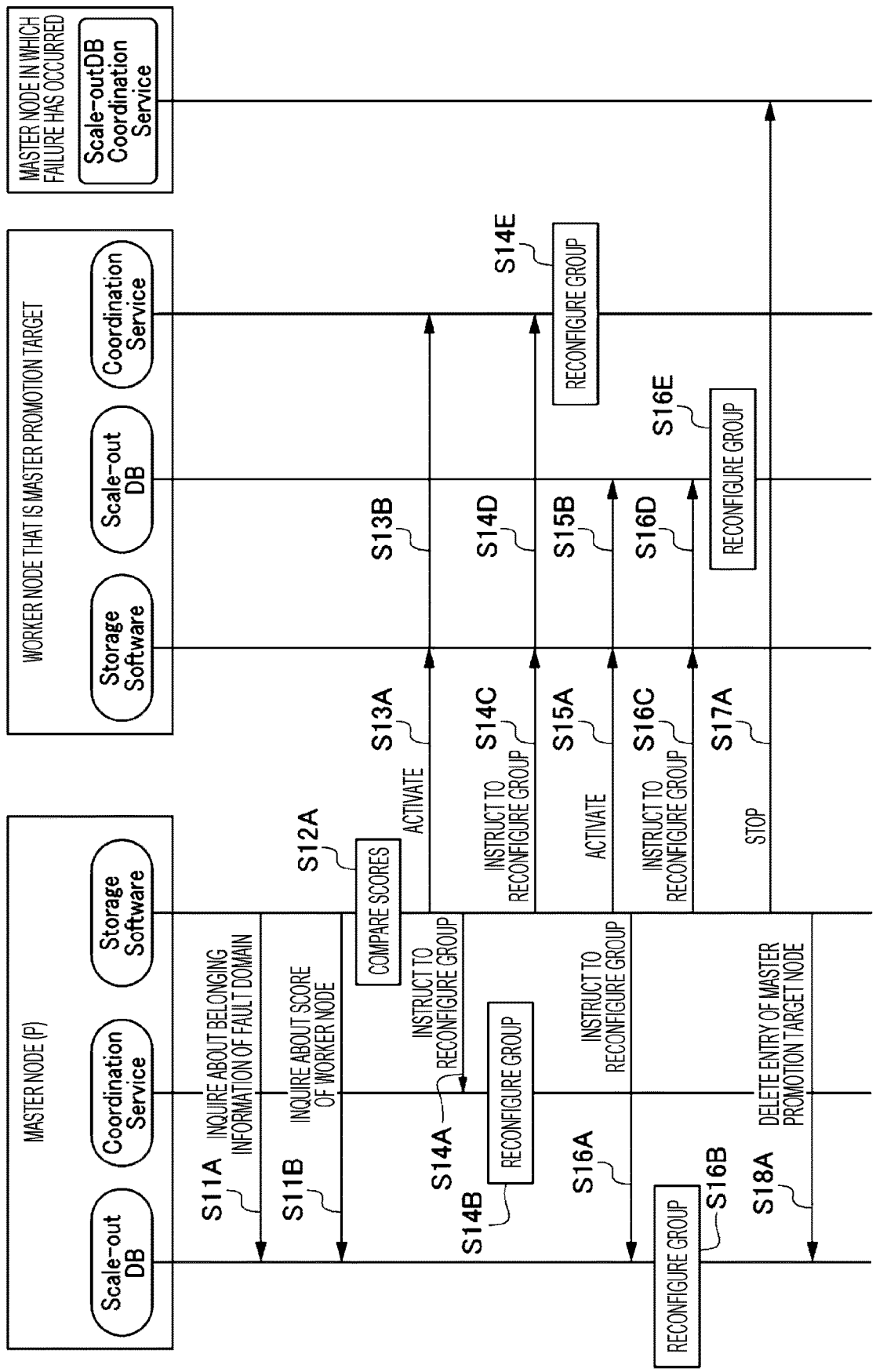
FIG. 22 is a sequence diagram illustrating a relationship between processing of a master node (P) and processing of a worker node according to the embodiment of the present invention.

FIG. 22 is a sequence diagram illustrating a relationship in processing between a master node (P) and a worker node. A reference sign of each processing step illustrated in FIG. 22 is associated with each processing step illustrated in FIG. 21.

First, the promotion node selection unit 52 of the master node (P) checks the number of master nodes for each fault domain (S11 in FIG. 21). At this time, the storage software of the master node (P) inquires of the scale-out DB of its own node about belonging information of the fault domain (S11A in FIG. 22). In addition, the storage software of the master node (P) inquires of the scale-out DB of its own node about a score of the worker node (S11B in FIG. 22), and acquires the score of the worker node.

Next, the promotion node selection unit 52 compares scores of the worker nodes (S12 in FIG. 21). At this time, the storage software of the master node (P) compares the scores of the worker nodes (S12A in FIG. 22).

Next, the storage software of the master node (P) activates the coordination service of the worker node that is a master promotion target (S13 in FIG. 21). At this time, the storage software of the master node (P) transmits an activation instruction of the coordination service to the storage software of the worker node that is the master promotion target (S13A in FIG. 22). When receiving the activation instruction, the storage software of the worker node activates the coordination service of its own node (S13B in FIG. 22).

Next, the master-side group reconfiguration unit 53 of the master node (P) reconfigures the coordination service group of the master node (P), and the worker-side group reconfiguration unit 32 of the worker node that is the master promotion target reconfigures the coordination service group of its own node (S14 in FIG. 21). At this time, the storage software of the master node (P) instructs the coordination service of its own node to reconfigure the group (S14A in FIG. 22), and the master-side group reconfiguration unit 53 of the coordination service of the master node (P) reconfigures the coordination service group of its own node (S14B in FIG. 22). Therefore, the worker node that is the master promotion target is included as the master node in the coordination service group of its own node.

In addition, the storage software of the master node (P) instructs the storage software of the worker node that is the master promotion target to reconfigure the coordination service group (S14C in FIG. 22). The storage software of the worker node instructs the coordination service of its own node to reconfigure the group (S14D in FIG. 22), and the worker-side group reconfiguration unit 32 of the coordination service reconfigures the coordination service group of the worker node (S14E in FIG. 22). The content of the reconfigured coordination service group is the same as the content of the coordination service group of the master node (P) described in S14B of FIG. 22.

Next, the storage software of the master node (P) activates the scale-out DB of the worker node that is the master promotion target (S15 in FIG. 21). At this time, the storage software of the master node (P) instructs the storage software of the worker node that is the master promotion target to activate the scale-out DB (S15A in FIG. 22). When receiving the activation instruction, the storage software of the worker node activates the scale-out DB of its own node (S15B in FIG. 22).

Next, the master-side group reconfiguration unit 53 of the master node (P) reconfigures the scale-out DB group of the master node (P), and the worker-side group reconfiguration unit 32 of the worker node that is the master promotion target reconfigures the scale-out DB group of its own node (S16 in FIG. 21). At this time, the storage software of the master node (P) instructs the scale-out DB of its own node to reconfigure the group (S16A in FIG. 22), and the master-side group reconfiguration unit 53 of the scale-out DB of the master node (P) reconfigures the scale-out DB group of its own node (S16B in FIG. 22). Therefore, the worker node that is a master promotion target is included as the master node in the scale-out DB group of its own node.

In addition, the storage software of the master node (P) instructs the storage software of the worker node that is the master promotion target to reconfigure the scale-out DB group (S16C in FIG. 22). The storage software of the worker node instructs the scale-out DB of its own node to reconfigure the group (S16D in FIG. 22), and the worker-side group reconfiguration unit 32 of the scale-out DB reconfigures the scale-out DB group of the worker node (S16E in FIG. 22). The content of the reconfigured scale-out DB group is the same as the content of the scale-out DB group of the master node (P) described in S16B of FIG. 22.

Next, the master-side group reconfiguration unit 53 of the master node (P) stops the coordination service and the scale-out DB of the master node (S) in which a failure has occurred (S17). At this time, the storage software of the master node (P) stops the coordination service and the scale-out DB of the master node (S) in which a failure has occurred (S17A in FIG. 22).

Although the processing in which the coordination service and the scale-out DB are stopped has been described in step S17A, it is assumed that the master node (S) in which a failure has occurred is logically separated from the cluster 6 at the time of the failure occurrence of the master node (S). Therefore, it is possible to suppress the influence of the master node (S) in which a failure has occurred on other nodes.

Next, the score management unit 51 of the master node (P) updates the score table 40 (S18 in FIG. 21), and ends this processing. At this time, as illustrated in FIG. 12, the storage software of the master node (P) updates the score table 40 by deleting the entry of the master promotion target node from the score table 40 (S18A in FIG. 22).

<Display Example of Notification Screen>

Figure 23:
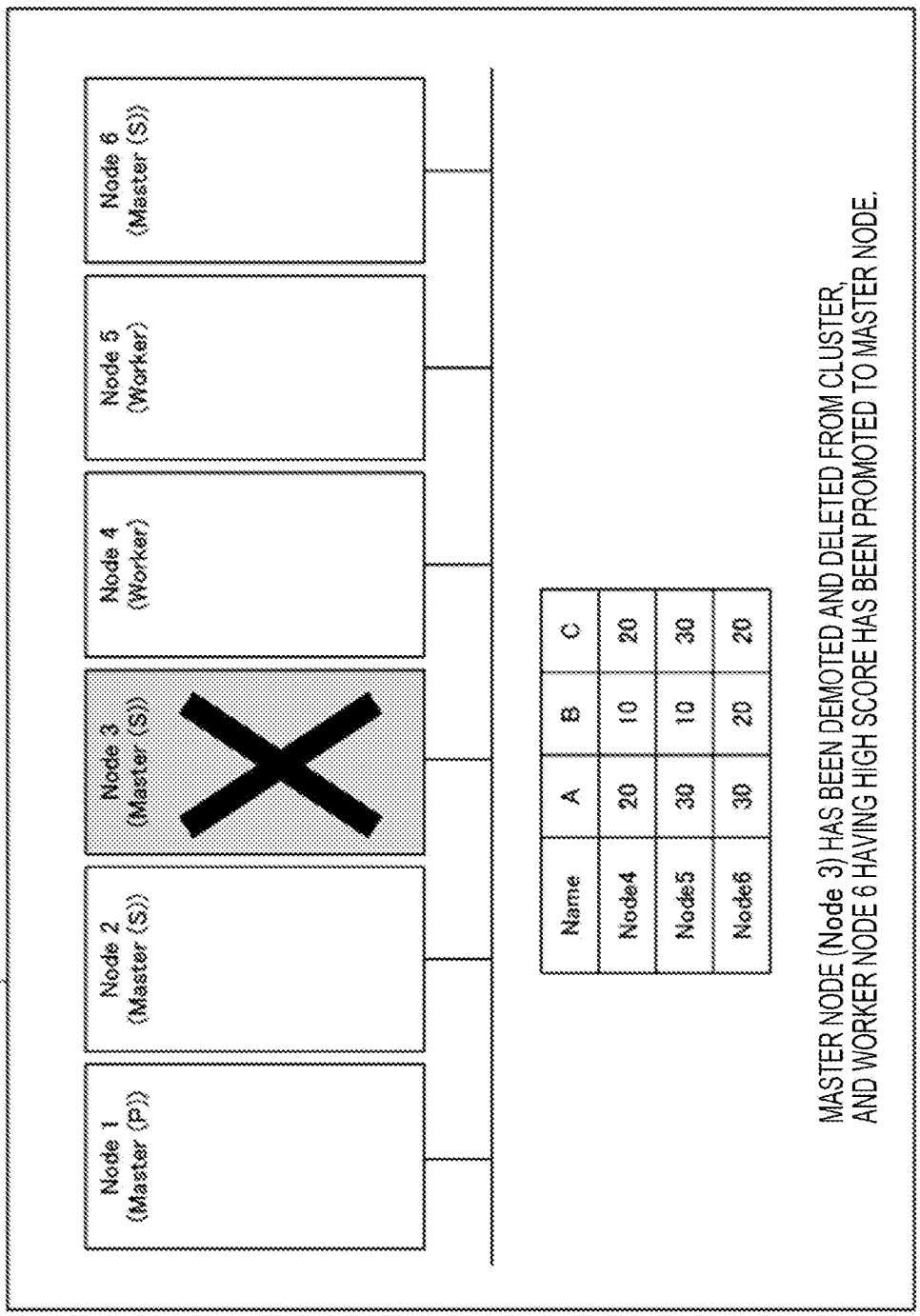
FIG. 23 is a diagram illustrating a display example of a notification screen according to the embodiment of the present invention.

FIG. 23 is a diagram illustrating a display example of the notification screen 70. The notification screen 70 is displayed when the worker node is promoted to a master when a failure occurs in the master.

The notification screen 70 is used by the user to confirm the master node in which a failure has occurred and the worker node promoted to the master. The notification screen 70 displays that the target cluster 6 includes the Node 1 to the Node 6, that the node in which a failure has occurred is the Node 3, and the score table 40 at the time of master promotion. A message that "the master node (Node 3) has been demoted and deleted, and the worker node 6 having a high score has been promoted to a master node" is displayed at a bottom of the notification screen 70. The user can confirm that the Node 3 that has been a master node has been demoted and the Node 6 that has been a worker node has been promoted to a master node on the notification screen 70. Therefore, the user can smoothly perform repair response, failure response, and the like of the Node 3 demoted from the master.

In the storage system 1 according to the embodiment described above, during the operation of the cluster 6, a worker node expected to stably operate as a master promotion target is automatically selected instead of the master node in which a failure has occurred, and the selected worker node is promoted to a master. Therefore, a worker node in which a failure is unlikely to occur is likely to be selected as the master promotion target. In addition, since the selection of the worker node to be the master promotion target is automated, it is not necessary for the user to select a worker node that can be promoted to a master from a large number of worker nodes. In addition, even when a failure occurs in a master node and a service stops, the service can be resumed in a short time by using a master node promoted to the master node, so that a service stop time can be reduced. Therefore, an availability of the storage system 1 can be enhanced without increasing a workload of the user.

In addition, during the operation of the cluster 6, the score calculation unit 31 of the worker node calculates a score representing how stably the worker node operates based on its own past number of times of failure occurrence, an operating time, and the like, and the score management unit 51 of the master node manages the score for each worker node. In addition, the promotion node selection unit 52 of the master node can compare the scores of the worker nodes at the timing when the master promotion is actually required, and automatically select a reliable worker node as the master promotion target.

In the score table 40, the scores are managed for each index classification. In addition, according to the priority order of the index classification, the worker nodes to be a master promotion target are selected in descending order of the scores. For this reason, a worker node in which a failure is unlikely to occur is likely to be selected as the master promotion target.

In addition, the user is notified of information on the master node in which a failure has occurred, the content of the score table 40, and the worker node promoted to the master by the notification screen 70. The user can easily grasp the operation status of the cluster 6 through the notification screen 70, and can quickly respond to repair or replacement of the master node in which a failure has occurred.

In addition, in the cluster 6, the numbers of master nodes and worker nodes are managed for each fault domain, and a worker node belonging to a fault domain having a smallest number of master nodes is likely to be selected as a master promotion target. For this reason, after a worker node belonging to the same fault domain as the master node in which a failure has occurred is promoted to a master, it is possible to avoid, for example, stopping or the like of the master node promoted to the master due to power interruption by the failure response of the master node in which a failure has occurred.

Note that the present invention is not limited to the above-described embodiment, and it is obvious that various other application examples and modifications can be taken without departing from the gist of the present invention described in the claims.

For example, the above-described embodiment describes the configuration of the system in detail and specifically in order to describe the present invention in an easy-to-understand manner, and is not necessarily limited to those having all the described configurations. In addition, it is also possible to add, delete, and replace other configurations for a part of the configuration of the present embodiment.

In addition, control lines and information lines indicate what is considered to be necessary for the description, and do not necessarily indicate all the control lines and the information lines on the product. In practice, it may be considered that almost all the configurations are coupled to each other.

What is claimed is:

1. A storage system in which a plurality of storage nodes is coupled by a network, each of the plurality of storage nodes including a processor, a memory, and a storage device, and a cluster is configured by using the plurality of storage nodes as master nodes and using remaining storage nodes as worker nodes, wherein
the processor of each of the worker nodes includes a score calculation unit that calculates a score of the worker node based on a failure history and an operation status of the worker node, and
the processor of each of the master nodes includes a promotion node selection unit that compares the scores for the worker nodes when a failure occurs in one of the master nodes, and selects, based on the scores, the worker node to be promoted to the master node instead of the master node in which the failure has occurred,
wherein the processor of the master node includes a master-side reconfiguration unit that promotes the worker node selected by the promotion node selection unit to the master node and reconfigures the cluster, and
wherein a plurality of the master nodes are configured with a certain degree of redundancy, and
the promotion node selection unit selects the worker node to be promoted to the master node when a number of the master nodes cannot ensure the redundancy.

2. The storage system according to claim 1, wherein
the score calculation unit calculates the score as information with which the promotion node selection unit can compare the failure history and the operation status of the worker node for each index classification obtained by classifying an index, and
the memory of the master node has a score table in which score information is stored for each worker node and for each index classification.

3. The storage system according to claim 2, wherein
the index classification includes at least one of a main body failure that is an index of the failure history of the worker node, a network failure that is an index of the failure history of the network to which the worker node is coupled, an operating time that is an index related to an operation of the worker node, and a virtualization status that is an index related to a status of a virtualization environment of the worker node.

4. The storage system according to claim 2, wherein
the promotion node selection unit compares the scores for each index classification and for a plurality of the worker nodes according to a priority order defined in the index classification, and in a case where scores of the index classification having a higher priority order are equal in the plurality of worker nodes, the promotion node selection unit repeats processing of comparing the scores with the scores of the index classification having a next highest priority order, and selects the worker nodes with the same index classification and a higher score.

5. The storage system according to claim 2, wherein
the processor of the master node includes a score management unit that manages the score information received from the worker node based on the score table and invalidates, from the score table, the score of the worker node from which the score information cannot be received for a predetermined time or more.

6. The storage system according to claim 1, wherein
the master-side reconfiguration unit removes the master node in which a failure has occurred from the cluster and updates information on the storage node managed as the master node based on information on the worker node to be promoted to the master node, and
the processor of the worker node to be promoted to the master node includes a worker-side reconfiguration unit that is activated to operate as the master node according to an instruction of the promotion node selection unit and reconfigures information necessary as the master node in synchronization with the master-side reconfiguration unit.

7. The storage system according to claim 1, wherein
a fault domain is set for each of the plurality of storage nodes sharing at least one of a power supply system and a network switch, and
the promotion node selection unit selects the worker node to be promoted to the master node in units of the fault domain.

8. The storage system according to claim 7, wherein
the promotion node selection unit selects the worker node to be promoted to the master node from the worker nodes included in the fault domain having a smallest number of master nodes.

9. The storage system according to claim 1, wherein
one of the plurality of master nodes is configured as a primary used as an active system, and rest are configured as a secondary used as a standby system, and
the master node configured as the primary receives the score information from the worker node, and reflects the score information in the master node configured as the secondary.

10. A storage node management method performed in a storage system in which a plurality of storage nodes is coupled by a network, each of the plurality of storage nodes including a processor, a memory, and a storage device, and a cluster is configured by using the plurality of storage nodes as master nodes and using remaining storage nodes as worker nodes, the storage node management method comprising:
calculating, by the processor of each of the worker nodes, a score of the worker node based on a failure history and an operation status of the worker node; and
comparing, by the processor of each of the master nodes, the scores for the worker nodes when a failure occurs in one of the master nodes, and selecting, based on the scores, the worker node to be promoted to the master node instead of the master node in which the failure has occurred,
wherein the processor of the master node includes a master-side reconfiguration unit that promotes the worker node selected by the promotion node selection unit to the master node and reconfigures the cluster, and
wherein a plurality of the master nodes are configured with a certain degree of redundancy, and
the promotion node selection unit selects the worker node to be promoted to the master node when a number of the master nodes cannot ensure the redundancy.

* * * * *